US012603858B1

(12) United States Patent
    Shafiq

(10) Patent No.: US 12,603,858 B1
(45) Date of Patent: Apr. 14, 2026

(54) DYNAMIC MESSAGING APPLICATION WITH SCHEDULING, TRANSLATION, AND PRIVACY FEATURES

(71) Applicant: Yasir Shafiq, Perland, TX (US)

(72) Inventor: Yasir Shafiq, Perland, TX (US)

( * ) Notice: Subject to any disclaimer, the term of this patent is extended or adjusted under 35 U.S.C. 154(b) by 0 days.

(21) Appl. No.: 19/237,469

(22) Filed: Jun. 13, 2025

(51) Int. Cl.
    *H04L 51/56* (2022.01)
    *H04L 51/046* (2022.01)
    *H04L 51/52* (2022.01)
    *H04N 23/62* (2023.01)
    *H04N 23/667* (2023.01)
    *H04N 23/69* (2023.01)
    *H04N 23/74* (2023.01)

(52) U.S. Cl.
    CPC ............ *H04L 51/56* (2022.05); *H04L 51/046* (2013.01); *H04L 51/52* (2022.05); *H04N 23/62* (2023.01); *H04N 23/667* (2023.01); *H04N 23/69* (2023.01); *H04N 23/74* (2023.01)

(58) Field of Classification Search
    CPC ....... H04L 51/56; H04L 51/046; H04L 51/52; H04N 23/62; H04N 23/667; H04N 23/69; H04N 23/74
    See application file for complete search history.

(56) References Cited

U.S. PATENT DOCUMENTS

| | | | |
|---|---|---|---|
| 2020/0220835 A1* | 7/2020 | Kwatra | ................... H04L 51/56 |
| 2024/0176960 A1* | 5/2024 | Maurer | ................. G06F 16/345 |
| 2024/0414259 A1* | 12/2024 | Kenawy | ........... H04M 1/72433 |

FOREIGN PATENT DOCUMENTS

WO      WO-2024057285 A1 *   3/2024   ........... H04L 51/212

* cited by examiner

*Primary Examiner* — Philip C Lee
(74) *Attorney, Agent, or Firm* — Bay State IP, LLC

(57)                 ABSTRACT
A messaging and social interaction system integrating advanced communication, privacy, AI-driven assistance, and an innovative camera module for enhanced multimedia sharing. The system includes a dynamic message scheduling and unscheduling module that enables users to schedule messages for future delivery based on recipient availability, location, or behavioural triggers, while allowing cancellation before dispatch. A private chat feature incorporates a hide/unhide mechanism, secured by a passcode-protected virtual room with biometric authentication. A self-destructing messaging module ensures messages are automatically deleted based on predefined conditions, including time-based expiration and single-view destruction. The system further includes a private calling feature with encrypted calls, call log obfuscation, and self-erasing call records. An AI-powered messaging assistant provides real-time message translation, intelligent conversation summarization, and predictive offline message composition.

20 Claims, 15 Drawing Sheets

Admin Types
message & clicks
"Schedule Message"
button

Calendar
and time
picker
opens

User selects date and time

User confirms
scheduling

Message is queued
for delivery

Scheduled
time
reached?   No

Yes

Message delivered to
group members

Admin Types
message & clicks
"Schedule Message"
button

Calendar
and time
picker
opens

User selects date and time

User confirms
scheduling

Message is queued
for delivery

Scheduled
time
reached?

No

Yes

Message delivered to
group members

DYNAMIC MESSAGING APPLICATION WITH SCHEDULING, TRANSLATION, AND PRIVACY FEATURES

FIELD OF THE INVENTION

The present invention relates to the field of electronic messaging systems, and more particularly to an advanced, intelligent messaging platform incorporating artificial intelligence (AI), real-time translation, dynamic scheduling, privacy-enhancing mechanisms, and automated task integration. The invention enhances user communication by enabling message scheduling based on recipient behaviour, expiring messages for enhanced privacy, AI-powered conversation summarization, and secure chat-hiding features. Additionally, it introduces offline message composition with predictive synchronization, voice-to-text transcription, and location-based user discovery to improve accessibility, security, and efficiency in digital conversations.

BACKGROUND OF THE INVENTION

Instant messaging platforms have revolutionized communication, allowing users to exchange messages in real time across various devices and networks. The increasing reliance on messaging applications for personal, professional, and business communications has necessitated the development of advanced features to enhance user experience, security, efficiency, and automation. While numerous messaging platforms exist, many lack a comprehensive suite of intelligent functionalities that cater to modern communication needs. The present invention seeks to address these deficiencies by integrating dynamic scheduling, secure expiring messages, real-time translation, AI-driven message summarization, offline messaging capabilities, advanced voice note management, and enhanced privacy controls.

Existing solutions provide partial implementations of these features but fail to deliver a holistic system that effectively integrates multiple functionalities within a single messaging platform. Several prior art references discuss aspects of messaging systems, including scheduled message sending, privacy features, dynamic alerts, and content obscuring mechanisms. However, these references do not sufficiently address the need for an all-encompassing messaging system that integrates artificial intelligence, security enhancements, task management, and seamless offline functionality.

Several patents and prior art documents have explored various aspects of messaging systems, including message scheduling, privacy controls, AI-powered enhancements, and translation features. However, they fail to provide a comprehensive and fully integrated solution that seamlessly combines dynamic message scheduling, real-time translation, expiring messages, AI-driven conversation summarization, offline message composition with predictive synchronization, and advanced privacy controls. Existing solutions either focus on isolated functionalities or lack the adaptability required for modern communication needs. The present invention addresses these limitations by offering a unified messaging platform with intelligent automation, enhanced security, and seamless cross-language communication, ensuring an optimized and efficient user experience.

1. US20240121204A1—Scheduled Message Sending Based on Trigger Conditions

US20240121204A1, discloses a method for delaying the sending of messages in a chat application based on trigger conditions. The system automatically suggests scheduling a message for later delivery if specific conditions are met. The trigger conditions may include recipient availability, message context, or predefined scheduling preferences.

While this reference introduces the concept of message scheduling, it does not allow users to dynamically set messages based on real-time behavior or presence detection. The present invention builds upon this concept by providing a more flexible approach where messages are scheduled dynamically based on user behavior patterns, location, or detected availability. Unlike US20240121204A1, which focuses on system-generated scheduling suggestions, the present invention offers user-defined scheduling that adapts to context-based triggers. Additionally, the ability to unschedule a message manually further enhances user control over scheduled communications, a feature absent in the cited prior art.

2. US20210224765A1—Synchronous Content Viewing for Collaborative Interactions

US20210224765A1, describes a system for providing synchronized content viewing in collaborative environments. The system enables multiple users to interact with shared content in real time while maintaining synchronized playback across devices. This invention primarily targets social networking, business collaboration, and entertainment applications where real-time interaction with shared content is essential.

While synchronous communication is a key component of modern messaging applications, this reference does not address essential messaging functionalities such as AI-driven messaging automation, security features, or task integration. The present invention expands upon the concept of real-time engagement by incorporating AI-based features such as message summarization, predictive response suggestions, and intelligent task management within a messaging environment. Unlike the prior art, which focuses on synchronized content consumption, the present invention enhances productivity through dynamic message-to-task conversion and integrated calendar functionalities.

3. US20240012930A1—Hiding Conversation Elements Based on User Input

US20240012930A1, discloses a system for obscuring specific elements within a messaging interface based on user-defined inputs. The system detects certain input combinations, which then trigger the hiding of specific chat elements. This feature primarily enhances privacy by allowing users to selectively obscure portions of a conversation when interacting within a messaging platform.

While this reference addresses the concept of content obscuring, it lacks a structured and secure method for chat hiding and retrieval. The present invention introduces an advanced hide/unhide chat feature where users can assign a room number and passcode for concealing specific chats. Unlike US20240012930A1, which relies on input-based triggers for content obscuration, the present invention provides an authentication mechanism requiring both a room number and a passcode for chat visibility. Furthermore, the ability to recover the passcode via registered email adds an additional layer of security, a functionality missing in the cited prior art. 4. US20200089910A1—Message Privacy and Secure Annotations in Chat Conversations US20200089910A1, discloses a method for ensuring message privacy in chat applications. It introduces private annotations within conversation threads and allows selective message hiding within existing chats. The system enables users to annotate conversations privately without other participants seeing the notes.

While this reference addresses privacy, it does not introduce an automatic expiring message functionality where secure messages self-destruct after a defined interval. The present invention extends privacy features by incorporating expiring messages that delete automatically after being read or after a set duration. The flexibility in setting deletion intervals ensures enhanced confidentiality, which is not available in US20200089910A1. Additionally, the ability to configure secure chat rooms with password-protected access further enhances the security mechanisms beyond what is described in this prior art.

5. IN202411062294—Dynamic Alert Generation in a Messaging Platform

IN202411062294, presents a method for generating dynamic alerts in messaging applications. It employs artificial intelligence (AI) to analyze contextual changes in messages, edits, reactions, and preceding chat interactions to generate appropriate notifications or suggestions for users.

While this invention introduces AI-driven alert generation, it does not cover broader AI applications in messaging, such as real-time translation, summarization, or predictive message responses. The present invention incorporates AI at multiple levels, including:

Real-Time Translation: Enabling seamless communication across different languages.

AI-Powered Summarization: Generating concise summaries of long conversations to enhance readability.

Smart Message Suggestions: Adapting message recommendations based on the conversational flow.

Unlike IN202411062294, which focuses solely on alert mechanisms, the present invention leverages AI to create an intelligent, multi-functional messaging platform that enhances both communication efficiency and user engagement.

Key Innovations and Advantages of the Present Invention

The present invention introduces a next-generation messaging platform that integrates multiple advanced features into a single system, addressing gaps in prior art. The key innovations include:

Dynamic Message Scheduling and Unscheduling: Unlike prior art that only provides static scheduling options, this system enables intelligent scheduling based on user behavior, presence detection, and real-time conditions. Users can also unschedule messages if needed.

Secure Expiring Messages: Provides automatic deletion of messages after being read or after a set duration, enhancing confidentiality beyond conventional message privacy mechanisms.

AI-Driven Real-Time Translation: Supports multilingual communication by providing seamless language translation within conversations, a feature not addressed in prior messaging patents.

Task Conversion and Calendar Integration: Enables users to convert messages into actionable tasks, reminders, or meeting invitations, integrating with external calendar applications.

Offline Messaging with AI-Powered Synchronization: Users can draft messages offline, with AI predicting optimal sync times based on network availability and past communication patterns.

Advanced Voice Note Transcription and Editing: Converts voice messages into searchable and editable text, ensuring smooth transitions between audio and text-based communication.

Chat Privacy and Authentication Features: Introduces a unique hide/unhide chat feature with a room number and passcode authentication system, surpassing traditional content obscuring methods.

Nearby Feature for Localized Communication: Allows users to connect with people in their immediate vicinity, adjusting the search radius for enhanced social or business networking.

Status Feature for Enhanced Engagement: Provides real-time updates and user activity indicators within the chat application, fostering interactive engagement.

The present invention represents a significant advancement in the field of messaging applications by integrating AI-driven automation, security enhancements, and productivity tools into a single platform. A detailed comparison with prior art reveals that existing messaging systems either provide partial implementations of individual features or lack intelligent integration across multiple functionalities. By offering dynamic scheduling, expiring messages, AI-powered communication enhancements, and robust privacy controls, the present invention overcomes the limitations of existing solutions, providing a comprehensive, user-friendly, and secure messaging experience.

SUMMARY OF THE INVENTION

The present invention introduces an advanced messaging system that integrates multiple innovative features, addressing limitations in existing chat applications. This system enhances user experience by incorporating intelligent automation, real-time security mechanisms, AI-driven communication enhancements, and task management capabilities, making it a comprehensive messaging platform.

Key Features and Functionalities

1. Dynamic Message Scheduling and Unscheduling

The invention enables users to schedule messages dynamically based on real-time user behavior, presence detection, or predefined conditions. Unlike traditional scheduling systems that require manual input of a fixed time, this system analyzes contextual factors, such as recipient availability, past communication patterns, and location-based triggers, to optimize message delivery timing. Additionally, users can unschedule messages before they are sent, providing greater control over scheduled communications.

2. Secure Expiring Messages

To enhance privacy and security, the system introduces a mechanism for expiring messages that automatically delete after a predefined duration or upon being read. Users can configure message deletion rules, including self-destruction after a set interval, making the system ideal for confidential, time-sensitive, or temporary conversations. This feature provides an added layer of security beyond traditional message encryption.

3. AI-Powered Real-Time Translation

The invention incorporates an integrated AI-driven translation engine that facilitates seamless communication between users speaking different languages. Messages are automatically translated in real time, allowing users to converse naturally without language barriers. This feature is particularly beneficial for global teams, international business communications, and cross-cultural social interactions.

4. Smart Task Conversion and Calendar Integration

Recognizing the need for productivity tools within messaging applications, the system allows users to convert messages into actionable tasks, to-do lists, or meeting reminders. Users can directly assign tasks from chat conversations, schedule appointments, and integrate with external calendars such as Google Calendar or Microsoft Outlook. This feature transforms messaging from a passive communication tool into an active task management system.

5. Offline Messaging with AI-Powered Synchronization

The system allows users to compose and respond to messages even when offline. Unlike conventional offline messaging, which requires manual synchronization upon reconnection, the invention leverages AI to predict optimal sync times based on network availability, device usage patterns, and previous messaging behaviors. This ensures that messages are sent at the most efficient time without requiring user intervention.

6. AI-Driven Voice Note Transcription and Editing

To bridge the gap between text and voice-based communication, the system includes an advanced speech-to-text engine that automatically transcribes voice notes, Transcribed messages are searchable, editable, and can be converted into text replies. This feature enhances accessibility, making voice communication more structured and easier to reference in professional and personal conversations.

7. AI-Powered Message Summarization

Lengthy conversations can be difficult to review, especially in busy messaging environments. The system provides an AI-driven message summarization feature that generates concise summaries of long chat threads, enabling users to quickly grasp key points without scrolling through extensive messages. The AI models analyze context, sentiment, and user preferences to generate relevant and meaningful summaries.

8. AI-Based Message Suggestions and Predictive Responses

The system incorporates machine learning models that provide intelligent message suggestions based on conversation flow, tone, and prior interactions. This feature enhances communication efficiency by offering relevant reply suggestions, reducing response time, and ensuring consistency in messaging. AI-driven responses are adapted to professional, casual, or formal conversations based on user preferences.

9. Secure Chat Hiding and Authentication Mechanism

The invention introduces a privacy-focused chat concealment feature, allowing users to hide specific conversations using a room number and passcode mechanism. Hidden chats remain invisible until the user inputs the correct credentials. Unlike conventional hidden chat features that rely on simple toggles or archive functions, this system ensures enhanced privacy with an authentication-based retrieval method, Users can recover lost passcodes through their registered email accounts, preventing accidental data loss.

10. Nearby Feature for Localized Communication

The system integrates a geolocation-based "Nearby" feature that allows users to discover and communicate with others in their immediate vicinity. Users can adjust the radius (e.g., 100 meters, 1 km, etc.) to refine their search and connect with people based on proximity. This feature is valuable for social networking, local business communications, community engagement, and event-based interactions.

11. Status Feature for Enhanced User Engagement

To provide better engagement, the system includes a status feature that enables users to share updates, moods, or activity indicators with their contacts, Unlike basic availability indicators (online/offline), this feature allows users to post text, images, or short videos, fostering interactive communication similar to social media status updates.

Advantages and Novelty of the Invention

Enhanced Privacy and Security: Expiring messages, password-protected hidden chats, and secure authentication mechanisms ensure superior confidentiality compared to existing messaging platforms.

Intelligent Communication Assistance: AI-driven translation, summarization, and predictive responses optimize conversation efficiency.

Offline Usability with AI Synchronization: Unlike standard offline messaging, which relies on manual syncing, the AI-powered synchronization feature ensures optimal message delivery times.

Integrated Productivity Tools: The ability to convert messages into tasks and reminders directly within the chat enhances user productivity.

Seamless Cross-Language Communication: Automatic real-time translation fosters better engagement among users from diverse linguistic backgrounds.

Innovative Voice-Text Hybrid Communication: Voice note transcription and editing bridge the gap between audio and text-based messaging.

Localized Networking with Nearby Feature: Users can discover and interact with others based on geographical proximity, extending messaging beyond personal conversations into social networking and business contexts.

The present invention represents a significant advancement in messaging systems by integrating AI-driven automation, privacy enhancements, multilingual communication support, and productivity tools within a unified platform. Existing solutions fail to provide a holistic messaging experience that combines dynamic scheduling, secure expiring messages, real-time translation, and intelligent message handling. The proposed invention overcomes these limitations, delivering a robust, user-friendly, and highly secure messaging system tailored to modern communication needs.

BRIEF DESCRIPTION OF DRAWINGS

The accompanying illustrations are incorporated into and form a part of this specification in order to aid in comprehending the current disclosure. The pictures demonstrate exemplary implementations of the current disclosure and, along with the description, assist to clarify its fundamental ideas.

Figure 1A:
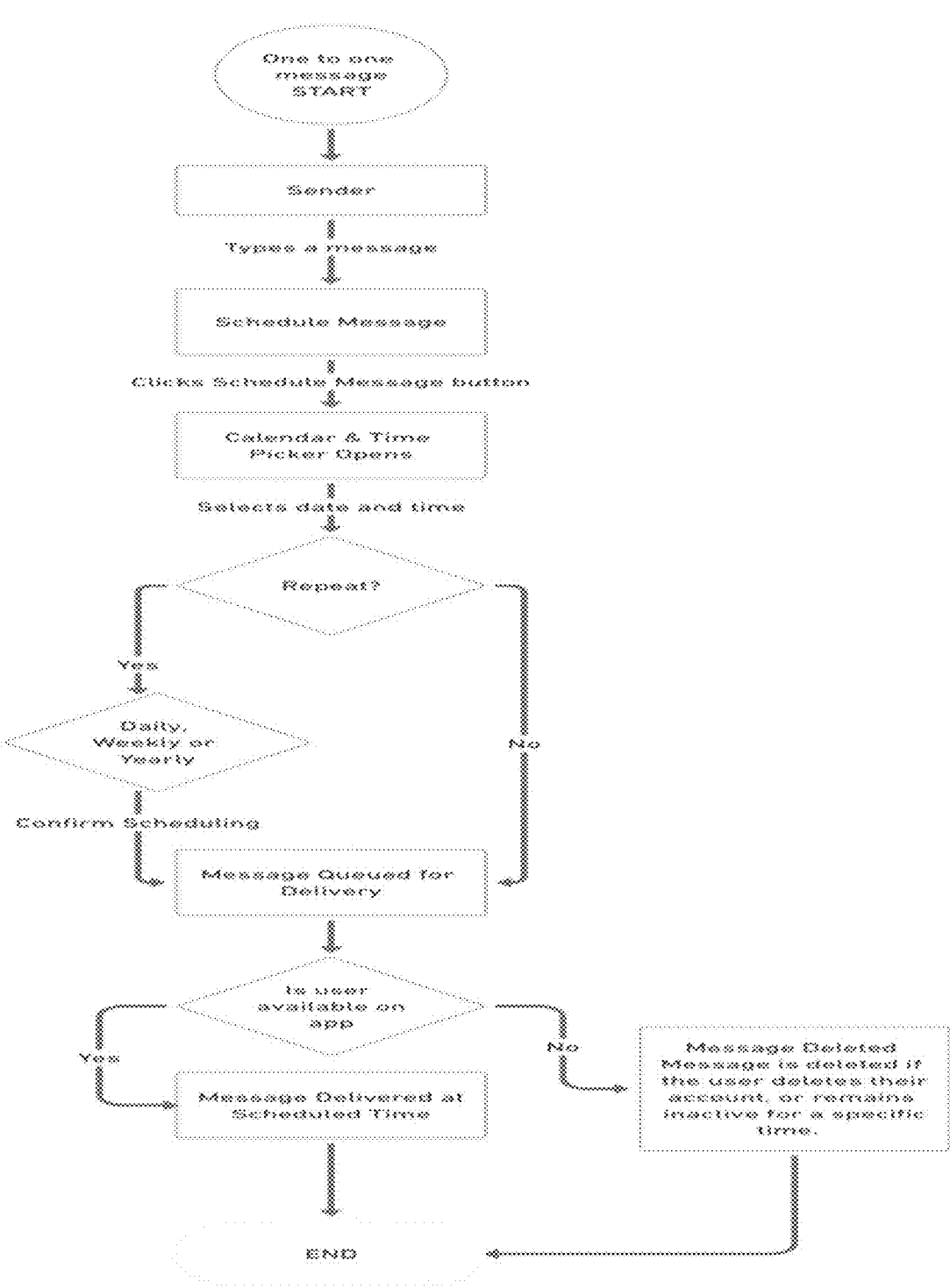
FIG. 1A: Illustrates the process of scheduling a chat for a one-to-one conversation, showing how a user selects a recipient, sets the conditions for message delivery, and confirms the scheduling.
Figure 1B:
FIG. 1B: Depicts the workflow for scheduling a chat in a group conversation, including selecting multiple recipients, defining message timing rules, and handling group interactions.
Figure 1B:
Figure 1B:
Figure 1B:
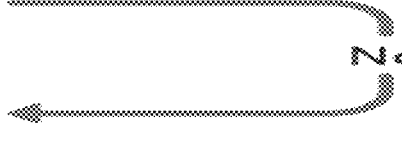
Figure 1B:
Figure 1C:
FIG. 1C: Shows the process of managing scheduled chats from the profile tab, allowing users to view, edit, or cancel scheduled messages before they are sent.
Figure 1C:
Figure 1C:
Figure 1C:
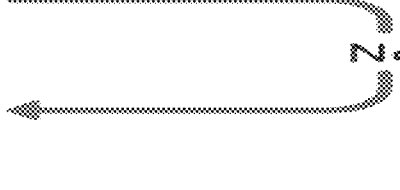
Figure 1C:

It should be noted that the figures are not drawn to scale, and the elements of similar structure and functions are generally represented by like reference numerals for illustrative purposes throughout the figures. It should be noted that the figures do not illustrate every aspect of the described embodiment sand do not limit the scope of the present disclosure.

Other objects, advantages, and novel features of the invention will become apparent from the following detailed description of the present embodiment when taken in conjunction with the accompanying drawings.

DETAILED DESCRIPTION OF THE INVENTION

The present invention relates to an advanced messaging system that enhances communication by integrating artificial intelligence, automation, security measures, and productivity-enhancing features. Conventional messaging applications primarily function as simple platforms for exchanging text, voice, and multimedia content. However, these applications often lack the flexibility and intelligence required for modern communication needs, such as message scheduling, real-time translation, automated task management, dynamic security controls, and AI-powered message assistance.

This invention addresses these limitations by providing a comprehensive messaging platform that optimizes communication efficiency, enhances privacy, and introduces new functionalities that streamline user interactions. The proposed system enables users to schedule messages dynamically based on behavioral patterns, unschedule them when needed, send expiring messages that automatically delete after a specified time, and translate conversations in real time. Additionally, it supports offline message composition with AI-driven synchronization, automatic transcription of voice notes, and AI-powered message summarization. Other innovative features include secure chat hiding, location-based user discovery, and AI-driven message suggestions that adapt to conversation flow.

1. Message Scheduling and Unscheduling

The present invention introduces a dynamic message scheduling and unscheduling system that allows users to send messages at a predetermined time, offering enhanced convenience, organization, and automation in communication. This feature is designed for both one-to-one and group conversations, ensuring that messages are delivered precisely when needed. Furthermore, users can manage their scheduled messages effectively, modify or cancel them if required, and even ensure that scheduled messages are dispatched despite network unavailability. The system also prioritizes security and performance, making it a reliable and scalable solution for modern messaging applications.

Use Case 1: Schedule a Chat for One-to-One Conversation

As shown in FIG. 1A, this feature allows users to schedule a message for a specific recipient at a chosen date and time. Instead of sending the message immediately, the user can select a calendar icon, pick a date and time, and even configure periodic scheduling for daily, weekly, or yearly messages. Once scheduled, the system ensures the message is delivered at the right time, even if the sender is offline. Users can also modify or cancel scheduled messages before delivery through a dedicated "Scheduled Chats" tab. If the user logs out or deletes the chat, all pending scheduled messages are automatically discarded. The server handles message delivery, ensuring that offline users still receive their scheduled messages when they come online.

Use Case 2: Schedule a Chat for Group Conversation

As shown in FIG. 11B, users can schedule messages for group chats, ensuring timely communication with all members, After selecting a group chat and composing a message, the user can set a delivery schedule and configure periodic messages if needed. The system ensures that the scheduled message reaches all active group members at the specified time. If a user leaves the group before message delivery, the system automatically excludes them from the recipients list. Additionally, users can disable all scheduled messages for a specific group through their profile settings, which cancels all pending messages. Group admins also retain control over editing or rescheduling messages from the "Scheduled Chats" tab.

Use Case 3: Manage Scheduled Chats from the Profile Tab

Figure 1D:
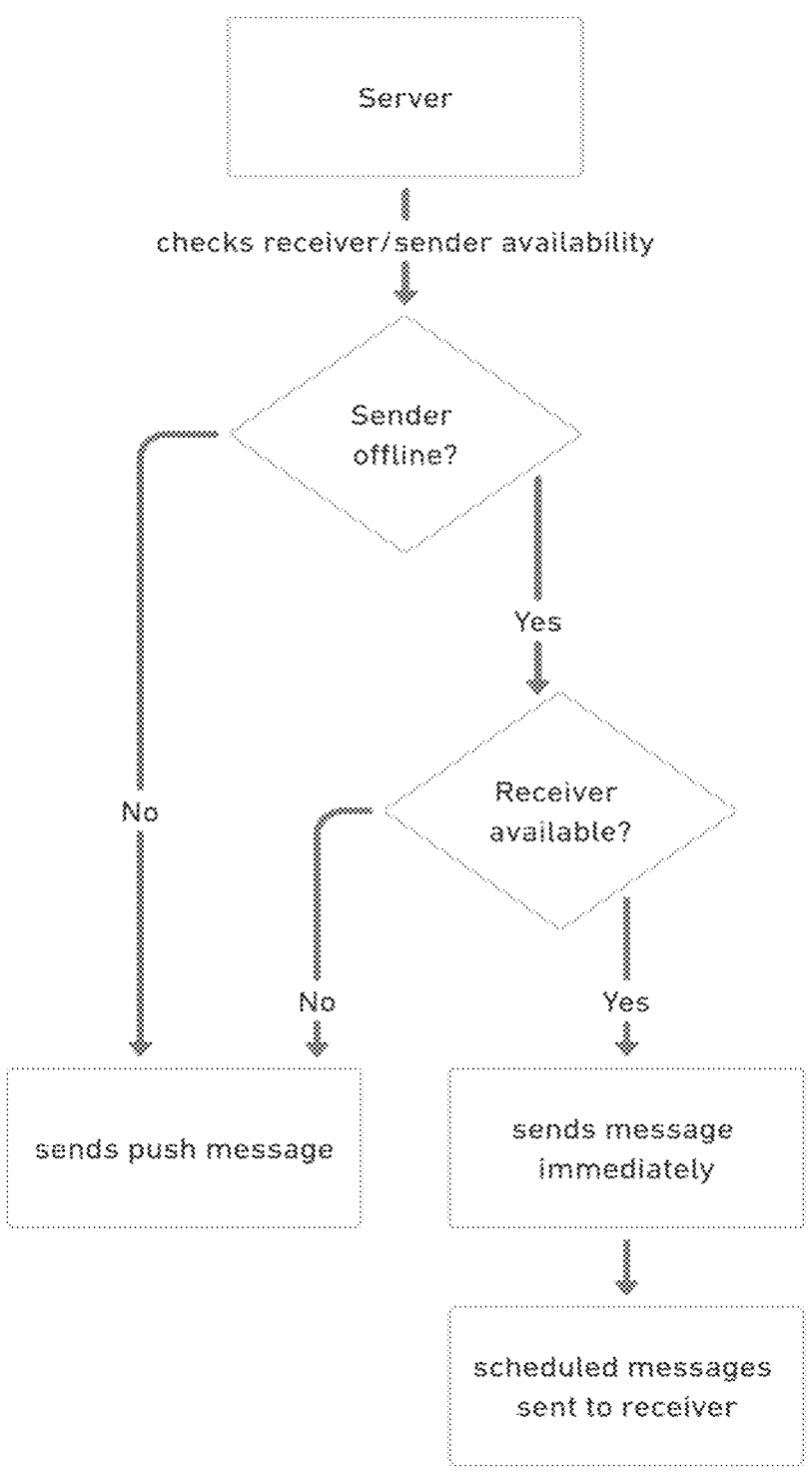
FIG. 1D: Demonstrates how scheduled chats are handled in offline mode, detailing how messages are queued and automatically sent when the user regains network connectivity.

As shown in FIG. 1D, Users can efficiently manage their scheduled messages via a centralized "Scheduled Chats" tab in their profile. This section displays a list of all scheduled messages, categorized by individual and group chats. Users can edit, delete, or reschedule any scheduled message before its delivery. A search bar allows users to find specific scheduled messages based on keywords. If necessary, users can disable all scheduled messages at once, ensuring that no pending messages are sent. The system dynamically updates any changes, providing full control over scheduled communication.

Use Case 4: Handle Scheduled Chats in Offline Mode

As shown in FIG. 1E, the system ensures that scheduled messages are delivered even when the sender or recipient is offline. When a user schedules a message and goes offline before the scheduled time, the server queues the message for delivery. The system ensures that even if both sender and receiver are offline, the scheduled message is still sent at the predefined time. If the recipient has blocked the sender before delivery, the system automatically discards the message and notifies the sender. This ensures smooth operation and prevents unintended delivery failures.

Use Case 5: Schedule Chats Using Existing Messages

Users can also schedule previously sent or received messages for future delivery. By long-pressing a message, users can access a "Schedule Message" option, set a delivery time, and confirm scheduling. This feature is particularly useful for resending important messages or reminders at a later date. If a user decides to cancel a scheduled message, they can do so through the "Scheduled Chats" tab, preventing unwanted message delivery.

Use Case 6: Handle Message Expiry Due to Inactivity

Scheduled messages are automatically disabled when a user logs out or remains inactive for an extended period (configurable, e.g., 30 days). If the user logs back in within this period, they receive a notification about their disabled scheduled messages. If the user does not return within the specified timeframe, the system permanently deletes all disabled scheduled messages. This mechanism prevents unintended message delivery due to prolonged inactivity while ensuring, users are notified before their scheduled messages expire.

Use Case 7: Handle Scheduled Messages on Admin Removal

When a group admin schedules messages and is later removed from their admin role, the system ensures that their scheduled messages are automatically deleted. Upon admin removal, the server identifies all pending messages associated with that admin and removes them. If a technical issue occurs, such as a database failure, the system logs the error and notifies other group admins. This prevents unintended message deliveries from former admins and ensures that only authorized users can manage scheduled content in a group.

Use Case 8: Handle Scheduled Messages on Chat Deletion

If a user deletes a chat with scheduled messages, the system prompts them with an option to either delete or retain the scheduled messages. If the user chooses to delete, all associated scheduled messages are removed permanently. If they choose to retain, the messages remain scheduled even after the chat is deleted, with a warning stating that scheduled messages will still be sent despite the chat being removed. If there are no scheduled messages in the chat, the system proceeds with deletion without any prompts. This feature ensures that users have full control over their scheduled messages when managing chats.

Server Management of Scheduled Messages

All scheduled messages are stored both locally and on the server, ensuring reliability and synchronization across devices. Even if a user changes devices, their scheduled messages remain intact. The server is responsible for handling offline message deliveries, blocking notifications, and message expiry, ensuring a seamless and controlled scheduling experience.

This scheduling system enhances user convenience, automation, and privacy, making it easier to manage messages across individual and group conversations while ensuring security and flexibility in different scenarios. User Interface Functions To facilitate intuitive message scheduling, the system integrates an interactive calendar and time picker. This user-friendly interface allows users to easily select delivery dates and times without manual entry, reducing the chances of errors. The profile tab serves as a centralized hub for managing scheduled messages, offering features like message modification, disabling, and deletion.

Additionally, a built-in notification system alerts users about pending scheduled messages, ensuring that important communications are not forgotten. This feature enhances the user experience by keeping them informed of upcoming scheduled messages and allowing them to take necessary actions before delivery.

Group Messaging Functions

For group messaging, the system is designed to handle multiple recipients efficiently. Scheduled messages in group chats are logged for transparency, providing users with insights into successful and failed message deliveries. If a message fails to reach certain group members due to connectivity issues, the system attempts redelivery when the recipients come online.

Moreover, the system allows administrators to oversee scheduled messages for the group, ensuring that time-sensitive announcements, reminders, and updates are efficiently managed. This feature enhances collaboration and communication within groups, making it an essential tool for team-based messaging.

Security and Privacy Measures

To maintain user privacy and data security, the invention employs robust encryption methods for storing scheduled messages. This ensures that message content remains protected until the designated delivery time. Additionally, session management techniques are used to clear scheduled messages upon prolonged user inactivity, preventing unauthorized access.

For enhanced privacy, users have the option to delete scheduled messages at any time, ensuring that they remain in control of their communication. Furthermore, message delivery logs provide transparency while maintaining confidentiality, allowing users to track the status of scheduled messages without exposing message content to third parties.

Scalability and Performance Optimization

The invention is designed for high scalability, ensuring efficient message scheduling even in high-volume environments. A queue management system prioritizes scheduled messages based on delivery time, preventing bottlenecks and system lag. Asynchronous message dispatch techniques further optimize performance, enabling seamless communication without delays.

Additionally, the system continuously monitors and adapts to network conditions, ensuring optimal scheduling accuracy. By employing advanced caching and load-balancing techniques, the invention maintains reliability even during peak usage periods.

2. Hide Chat Feature

The "Hide Chat" feature is designed to provide users with a secure and private way to store sensitive conversations in a password-protected environment called a Hidden Room. This feature ensures confidentiality by allowing users to move selected chats into a hidden room, accessible only through a unique Room Number and a PIN code. Users can create multiple hidden rooms, each secured with the same PIN, and retrieve chats using a search function. To further enhance security, email verification is required during setup, ensuring a recovery option for forgotten PINs. When a chat is moved to a hidden room, it disappears from the main chat interface, and any interaction with the corresponding contact in the normal chat list results in a blank conversation, preventing unauthorized access to hidden messages.

The system automatically locks hidden rooms when the app is closed or after a predefined period of inactivity, ensuring continuous protection. When reaccessing a hidden room, users must enter the correct Room Number and PIN. Additionally, the feature integrates with the search bar, allowing users to find hidden chats either by entering the room number or using the command "/hide chat" to list all hidden rooms. Users also have the ability to unhide chats, with the choice of either recovering them back into the main chat list or permanently deleting them. The PIN code management system enables users to update or reset their PIN through email verification. Furthermore, if a user attempts to message a contact linked to a hidden chat via their profile, the app ensures that a new blank conversation opens instead of revealing the hidden chat. This robust system enhances privacy, security, and user control over their confidential conversations.

Use Case 1: Creating a Hidden Room

Figure 2A:
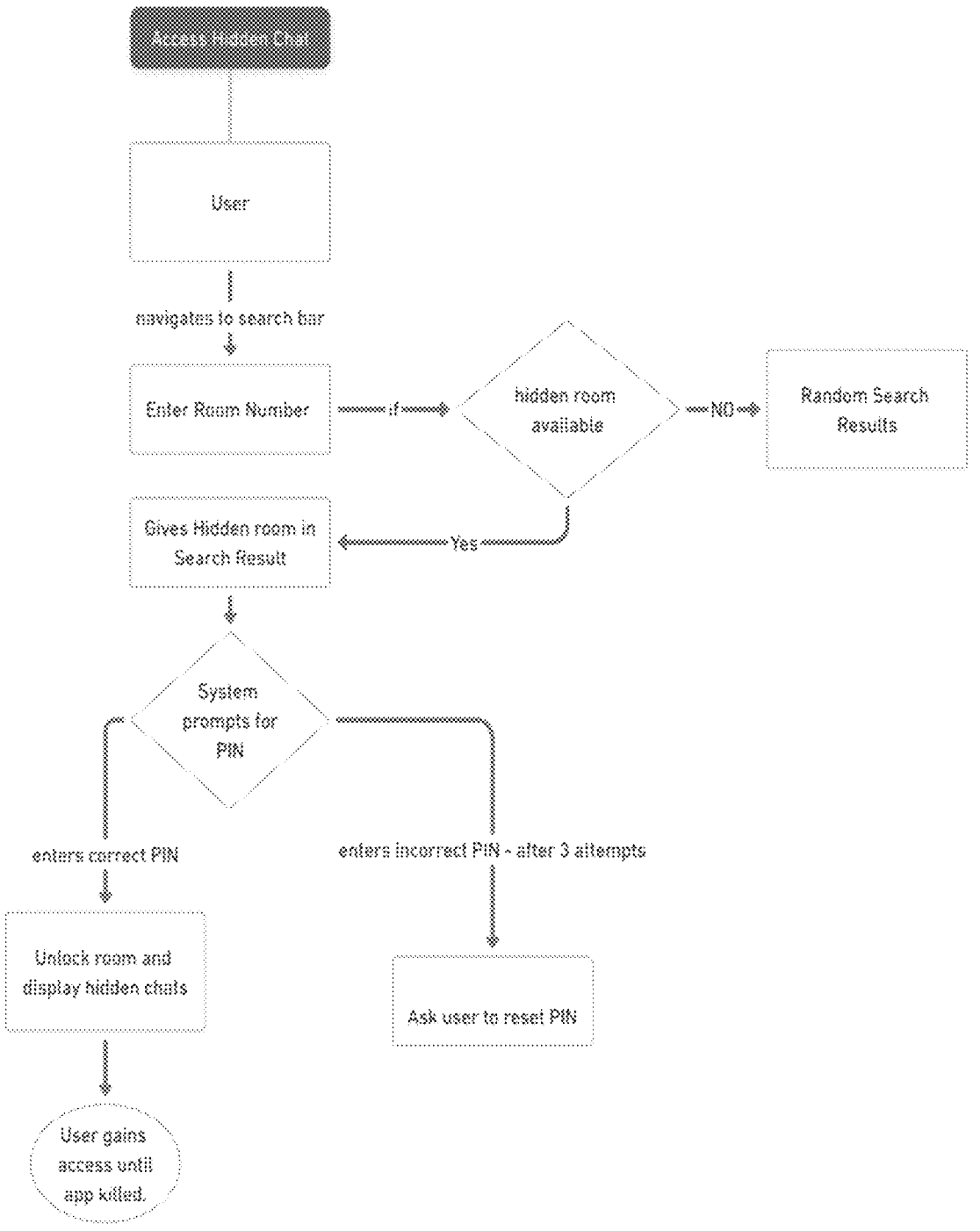
FIG. 2A: Illustrates the creation of a hidden room, including setting up a secure room number and passcode for accessing hidden conversations.

As shown in FIG. 2A, a user selects the "Hide Chat" option and creates a hidden room by setting a PIN and entering a unique Room Number. If no email is registered, the system prompts the user to add and verify one. Once created, the room can be accessed by searching for the Room Number.

Use Case 2: Hiding a Chat

Figure 2B:
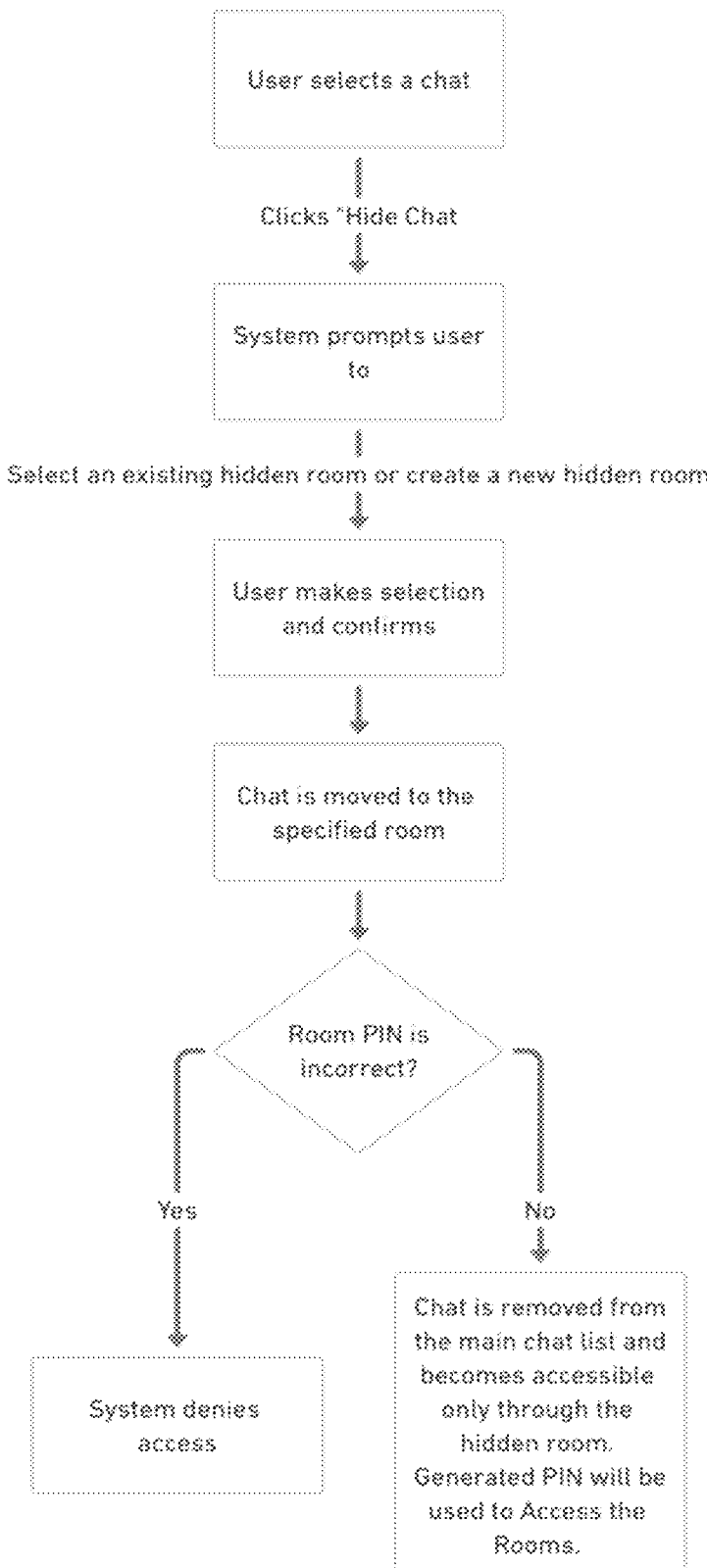
FIG. 2B: Depicts the process of hiding a chat by moving it into a hidden room, ensuring enhanced privacy and security.

As shown in FIG. 2B, a user selects a chat, chooses "Hide Chat," and assigns it to an existing hidden room or creates a new one. The chat is removed from the main interface and can only be accessed within the hidden room.

Use Case 3: Accessing a Hidden Room

Figure 2C:
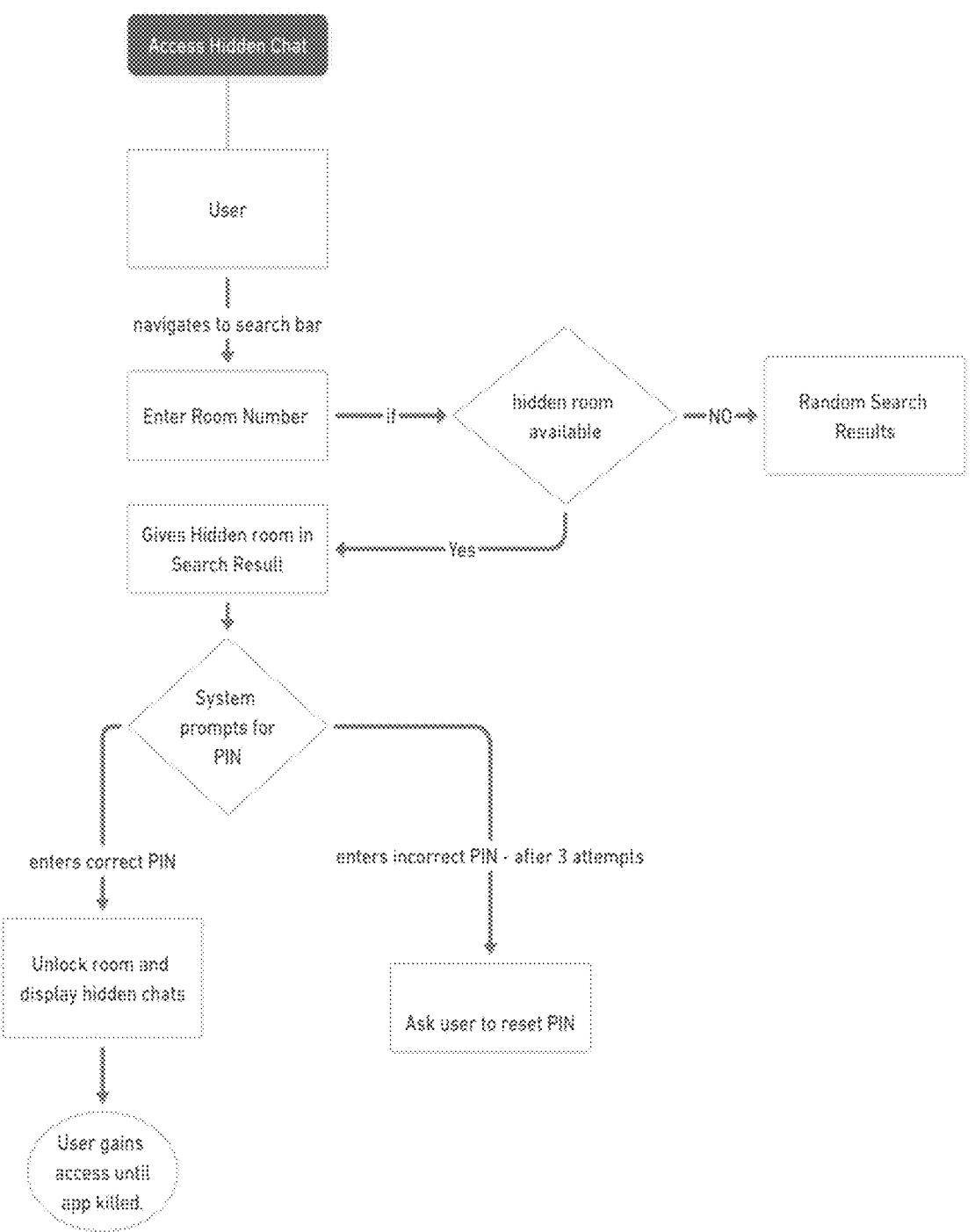
FIG. 2C: Shows how users access a hidden room by entering the correct room number and passcode, allowing retrieval of hidden conversations.

As shown in FIG. 2C, a user searches for a hidden room using its Room Number. The system prompts them to enter the correct PIN before displaying the chat. If the wrong PIN is entered three times, the room is temporarily locked, requiring PIN recovery.

Use Case 4: Searching for Hidden Chats

Figure 2D:
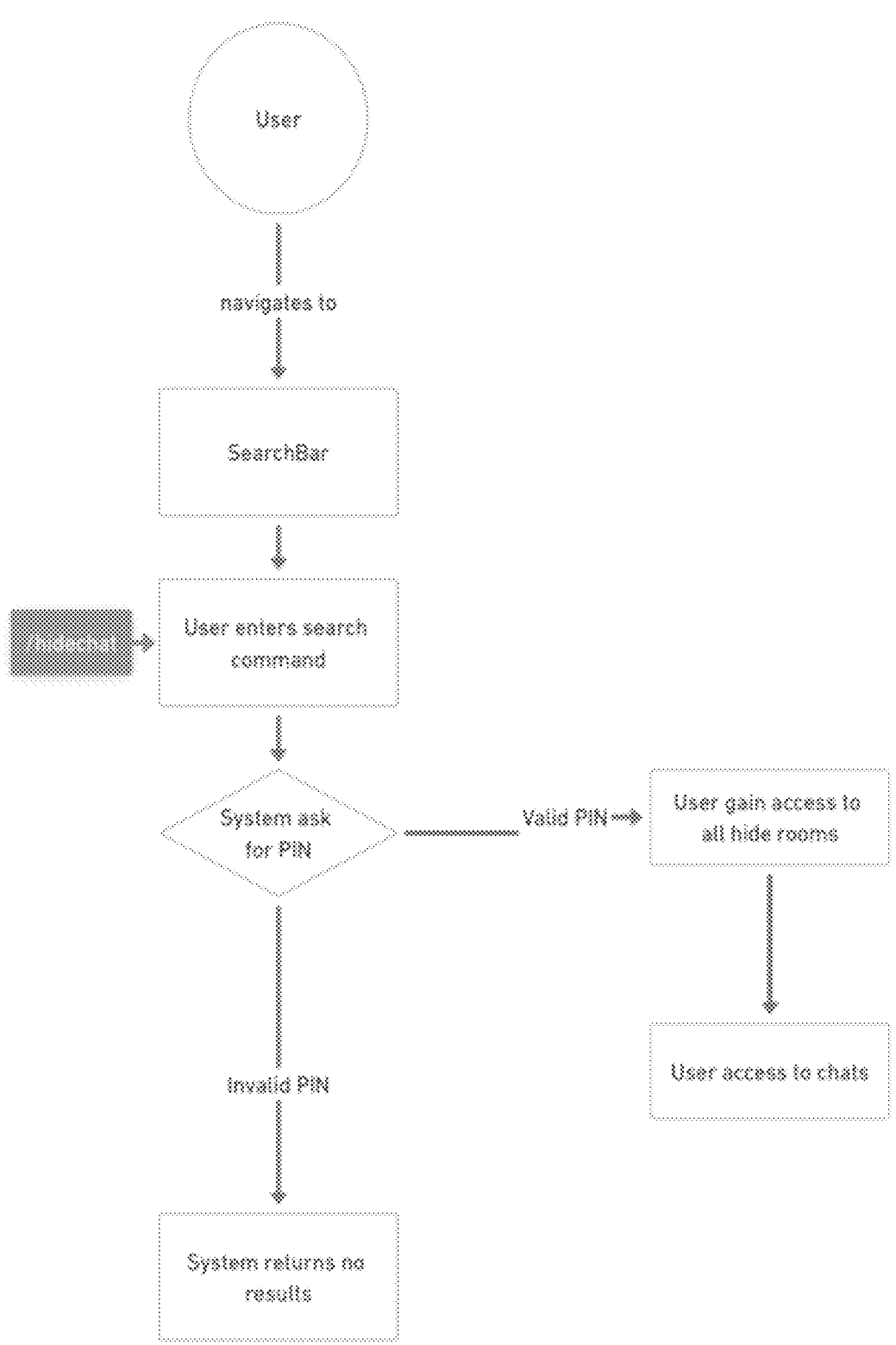
FIG. 2D: Demonstrates the search functionality for hidden chats, enabling users to locate specific hidden conversations efficiently.

As shown in FIG. 2D, if a user forgets the Room Number, they can enter the command "/hide chat" in the search bar. The system lists all hidden rooms, but access requires PIN verification.

Use Case 5: Unhiding a Chat

Figure 2E:
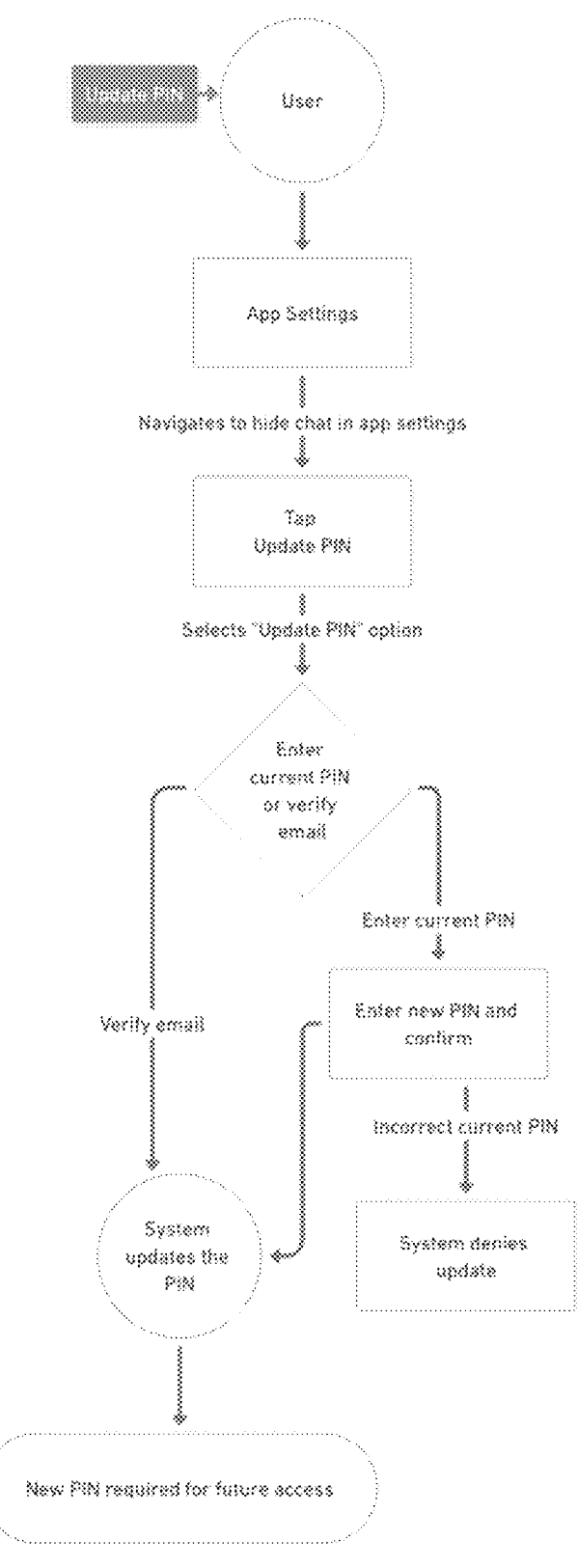
FIG. 2E: Depicts the process of unhiding a chat, where users move conversations back to the main chat list from the hidden room.

As shown in FIG. 2E, a user selects a hidden chat and chooses to unhide it, They can either permanently delete the chat or recover messages by exporting them to a file.

Use Case 6: Updating the PIN

Figure 2F:
FIG. 2F: Illustrates the workflow for updating the PIN associated with a hidden room, ensuring continued security for private conversations.

As shown in FIG. 2F, a user navigates to Settings>Hide Chat>Update PIN and either enters the current PIN or verifies their email. A new PIN is then set. If the current PIN is incorrect, the system denies the update.

Use Case 7: Sending a Message from a Contact Profile

Figure 2G:
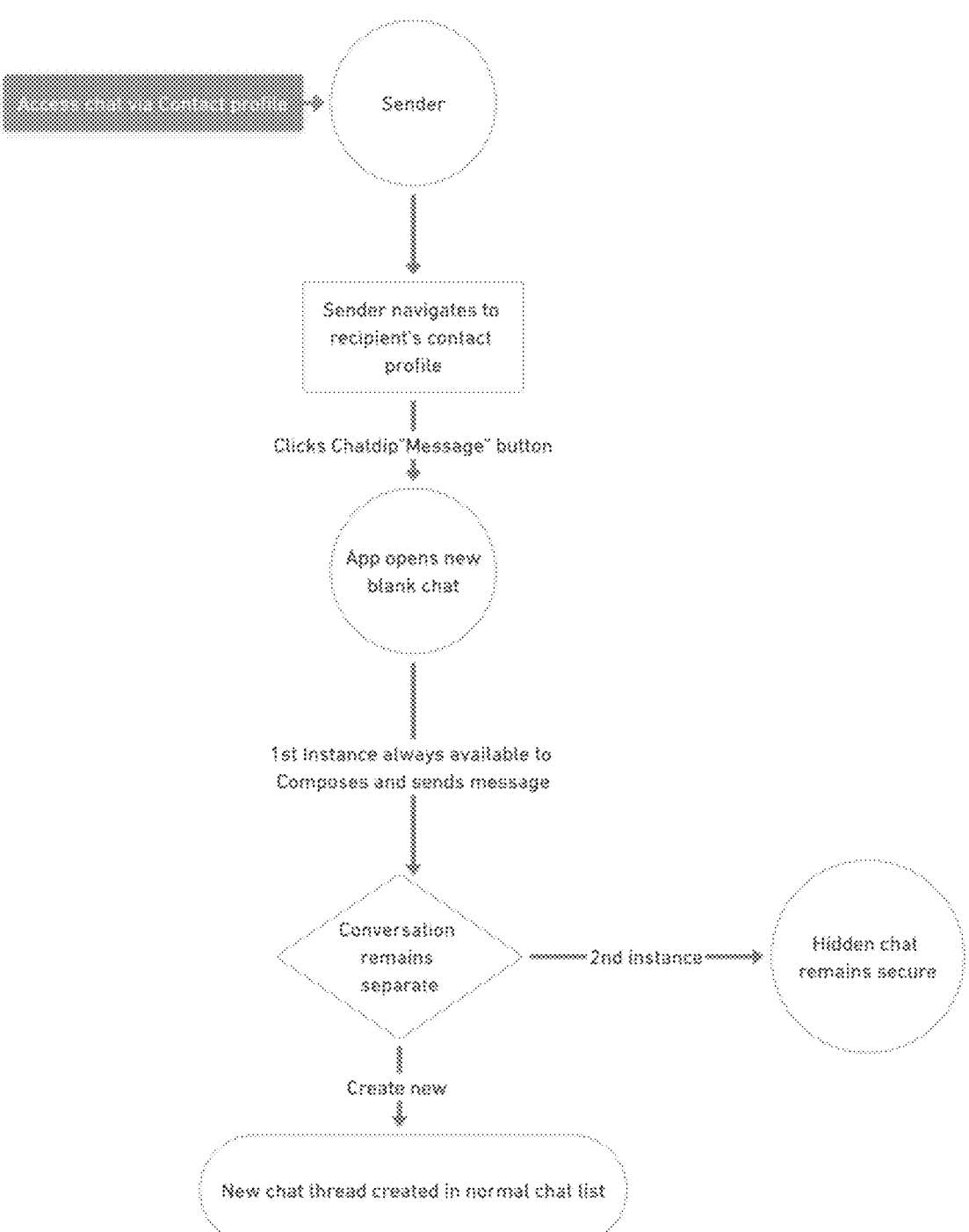
FIG. 2G: Shows how users can send a message directly from a contact profile while maintaining hidden chat settings.

As shown in FIG. 2G, if a sender attempts to message a recipient with a hidden chat, the system opens a blank chat instead of the hidden conversation. The sender can only access the hidden chat by entering the Room Number and PIN in the search bar.

3. The Private Chat

The Private Chat feature provides users with a secure and transient communication option designed to enhance privacy. Messages sent using this feature remain locked until the recipient interacts with them and automatically disappear after the pre-set timer expires. This functionality applies to text messages, audio messages, and video messages, ensuring secure communication across different media types.

When a Private Chat is sent, it is not immediately visible to the recipient. Instead, it appears as a locked message, requiring the recipient to tap and reveal its contents. For text messages, the countdown timer begins as soon as the message is accessed, while for audio and video messages, the timer starts only after 90% of the content has been played or if the playback cursor is dragged beyond the 90% mark. Once the tinier expires, the message is permanently deleted, leaving behind a label indicating that the chat has been removed.

Users must first enable the Private Chat feature in their global settings before they can send secure messages, Once activated, they have the flexibility to enable or disable it on a per-user basis through the chat-specific settings. This ensures that users can customize their privacy preferences based on individual conversations. The feature is designed to prevent messages from being saved, forwarded, or screenshotted, enhancing the security of confidential exchanges. Additionally, Private Chats cannot be replied to, further reinforcing their transient nature.

Enabling and Configuring Private Chat

To utilize Private Chat, users must first enable the feature globally. When enabled, the system allows users to send locked messages to any contact. However, users can also control the feature on a per-contact basis by toggling it on or off within individual chat settings. If a user disables Private Chat for a specific contact, all future messages exchanged with that person will follow regular chat rules.

When composing a Private Chat, users will see a timer icon in the chat input field. Tapping this icon allows them to set a self-destruction timer for the message. The available timer durations, as predefined by the system, include 5 minutes, 10 minutes, 30 minutes, 12 hours, and 24 hours. Once set, the timer applies to all subsequent Private Chats within that conversation unless manually changed by the user.

If a user attempts to send content exceeding these limits, the system prevents the message from being sent as a Private Chat and notifies the sender accordingly.

Receiving and Viewing Private Chats

When a recipient receives a Private Chat, it initially appears as a blurred or hidden message. The recipient must tap on it to reveal its contents. The moment a text message is accessed, the timer starts counting down to deletion. However, for audio and video messages, the timer starts only after 90% of the content has been played. If the recipient manually drags the playback cursor past the 90% mark, the timer is triggered immediately.

Once the timer runs out, the message is permanently deleted from both the sender's and recipient's chat windows, leaving behind a label stating, "Private Chat Deleted." If the recipient does not open the message, it remains hidden indefinitely until they interact with it, Feature Behavior and Restrictions The Private Chat feature is built with strict privacy measures to protect user conversations. Messages sent via Private Chat cannot be saved, forwarded, or screenshotted (subject to platform capabilities). Additionally, recipients cannot reply directly to a Private Chat, ensuring that the conversation remains temporary.

If a recipient does not interact with a Private Chat message, it stays locked until accessed. However, once opened, it follows the predefined expiration rules and disappears when the timer expires.

Future Enhancements: Screenshot Prevention

As a future enhancement, ChatDip aims to introduce screenshot prevention for Private Chats to further secure user privacy. If a recipient attempts to take a screenshot of a Private Chat, the system will either block the action or display a notification informing the user that screenshots are restricted. In cases where system limitations prevent screenshot blocking, ChatDip will implement an alternative solution such as displaying a blank screen in place of the captured message.

The Private Chat feature in ChatDip ensures secure, transitory, and private messaging, allowing users to send self-destructing messages with flexible timer options. By restricting message storage, forwarding, and screenshots, the feature significantly enhances user privacy. With the ability to manage settings at both the global and per-user levels, ChatDip provides users with complete control over their private conversations. Future enhancements, such as screenshot prevention, will further strengthen the security and confidentiality of Private Chats, making ChatDip a trusted platform for discreet communication.

Use Case 1: Enable Private Chat Feature (Global Settings)

The Private Chat feature in ChatDip can be enabled globally, allowing users to send secure messages across all conversations. To activate it, the user navigates to the global Chat Settings, where they locate the Private Chat toggle, By switching this toggle to "On," the system enables the feature for all contacts, ensuring that messages can be sent with self-destruction timers. If the user later decides to disable it, switching the toggle back to "Off" will revert all chats to regular messaging behavior. Once enabled globally, users can further refine their settings at the per-contact level to manage privacy on an individual basis, Use Case 2: Enable/Disable Private Chat Feature (Per User)

While the Private Chat feature is enabled globally, users can customize its functionality for individual contacts. To do this, they navigate to a specific chat, access the Chat Settings, and locate the Private Chat toggle. Switching this toggle "On" enables Private Chat for that particular contact, while switching it "Off" ensures that all future messages in the conversation follow standard messaging rules. This per-user setting provides flexibility, allowing users to enable private messaging selectively while keeping other conversations unrestricted.

Use Case 3: Compose & Send a Private Chat

When sending a Private Chat, users can compose text, audio, or video messages with an expiration timer. The user taps the Timer Icon in the chat input field to select a predefined timer duration, such as 5 minutes, 10 minutes, 30 minutes, 12 hours, or 24 hours. Once the timer is set, the user can compose a text message (up to 160 characters), record an audio or video message (up to 1 minute), and send it as a locked message. The recipient will only be able to view the message upon interaction, and it will be automatically deleted once the timer expires. If the user exceeds the message length limit, the system prevents them from sending the Private Chat, ensuring compliance with the feature's constraints.

Use Case 4: Receive and View a Private Chat

Upon receiving a Private Chat, the recipient sees a blurred or locked message with a lock icon. To access the content, they must tap on the message, which triggers the self-destruction tinier. For text messages, the countdown begins immediately. However, for audio and video messages, the timer only starts after 90% of the content has been played or if the playback cursor is manually dragged to that point. Once the timer reaches zero, the message is permanently deleted, leaving behind a "Private Chat Deleted" label to indicate its removal. If the recipient does not open the message, it remains hidden until they choose to interact with it.

Use Case 5: Message Expiry and Restrictions

Once a Private Chat is opened, it follows a strict self-destruct policy based on the selected timer. The message disappears once the timer runs out, preventing it from being saved, forwarded, or screenshotted (where system capabilities allow). Unlike standard messages, Private Chats do not support replies, ensuring that conversations remain temporary. If the recipient does not interact with the message before the sender's predefined duration, the message stays locked until accessed. These restrictions enhance security, ensuring that confidential conversations cannot be stored or shared beyond their intended recipients.

Use Case 6: Disable Screenshots for Private Chats (Future Enhancement)

As part of a future enhancement, ChatDip aims to prevent screenshots of Private Chats for added privacy. If a recipient attempts to take a screenshot of a Private Chat, the system will either block the screenshot attempt or display a notification informing the user that screenshots are restricted. In cases where direct blocking is not supported by the platform, an alternative solution will be implemented, such as capturing a blank screen instead of the message content. This enhancement will reinforce ChatDip's commitment to user privacy, ensuring that confidential messages cannot be captured or stored through unauthorized means.

4. The Private Call

The Private Call feature in the Chat Dip app provides users with a seamless and anonymous calling experience by ensuring that no traceable history is left behind. Unlike traditional calls that generate logs for dialed, received, and missed calls, this feature guarantees that once a call ends, no record remains within the app or the device's call history. The feature is designed for individuals who prioritize privacy in their communications, allowing them to make and receive voice or video calls without compromising confidentiality. Whether it's a sensitive conversation or a desire to remain anonymous, users can rely on Private Call to ensure their interactions remain undiscoverable.

Users can access the Private Call feature from the recipient's User Settings, where they have the option to enable or disable it. Once toggled on, the app provides an additional option for making a private call to that specific user. When engaged, all outgoing and incoming private calls occur in an incognito mode, where no caller information is stored post-call. Additionally, the call screen visually indicates the private mode by displaying a blurred background during video calls, reinforcing the concept of a completely confidential conversation. The recipient also sees a generic caller ID, such as "John Private Call," instead of the actual contact name, preventing identification.

When a Private Call is initiated, the Chat Dip app utilizes XMPP-Ejabberd integration for real-time communication, ensuring that call signaling is managed efficiently without persisting any records. The WebRTC protocol is used to establish a peer-to-peer connection, allowing high-quality voice and video communication while bypassing centralized call logging systems. To enhance privacy further, the app only stores temporary session details in in-memory storage (e.g., Redis), which are deleted immediately upon call termination. This ensures that neither the caller nor the recipient can retrieve any details once the conversation has ended.

During a Private Call, real-time media exchange occurs directly between users through WebRTC, maintaining end-to-end encryption (E2EE) for enhanced security. No call metadata such as timestamps, call duration, or participant details is stored at any point, preventing any form of tracking. Temporary notifications appear during an ongoing call, but they disappear immediately after the call ends, ensuring that there is no residual trace within the app or the device's notification logs. The absence of a call history screen within the Chat Dip app further reinforces the commitment to absolute privacy.

If a recipient misses a Private Call, no notification or call log remains once the call attempt expires. The system does not store missed call details, and the temporary session data automatically expires after a short predefined duration. This approach ensures that even if a user is unavailable, there is no evidence of the call attempt. By eliminating persistent storage of missed call data, the feature guarantees a level of confidentiality unmatched by conventional calling systems.

The backend implementation of Private Call relies on a privacy-first approach, ensuring that no permanent records exist on the server. Instead of using database logging, the system employs a short-term memory cache that temporarily holds call session details for call setup and execution. Once a call concludes, all session data is immediately purged from memory, making it impossible to retrieve any past communication logs. This approach prevents unauthorized access and enhances user anonymity.

To further strengthen privacy, Private Call incorporates end-to-end encryption (E2EE) to ensure that only the intended participants can access the call data. Unlike conventional call systems that store metadata such as call duration and timestamps, Chat Dip's Private Call feature does not retain any such information. This prevents external entities, including service providers, from gaining insights into user conversations. The absence of call metadata storage ensures that even if someone gains access to the server, they will not find any retrievable records.

The Private Call flow follows a structured yet privacy-focused approach. When a user initiates a call, the XMPP server facilitates signaling and establishes a WebRTC connection. The session details are temporarily stored in memory to maintain connectivity but are erased as soon as the call concludes. While the call is active, media exchange takes place through WebRTC's secure peer-to-peer channels. Once the call ends, all session data is wiped from memory, ensuring that no historical data is retained. This guarantees that neither the app nor the server has any logs of the interaction.

A user-friendly mockup design allows users to manage their privacy settings within the app's interface effortlessly. The Private Call toggle in the settings menu enables or disables the feature per user, giving them complete control over their calling preferences. Additionally, users can choose between Private Voice Call and Private Video Call, both of which function under the same anonymity principles. The call interface is designed to reinforce privacy awareness, with clear visual indicators and a blurred video background to distinguish private calls from regular ones. This ensures that users remain fully aware of the confidential nature of their conversations.

5. Like and Comment on DP

Figure 3A:
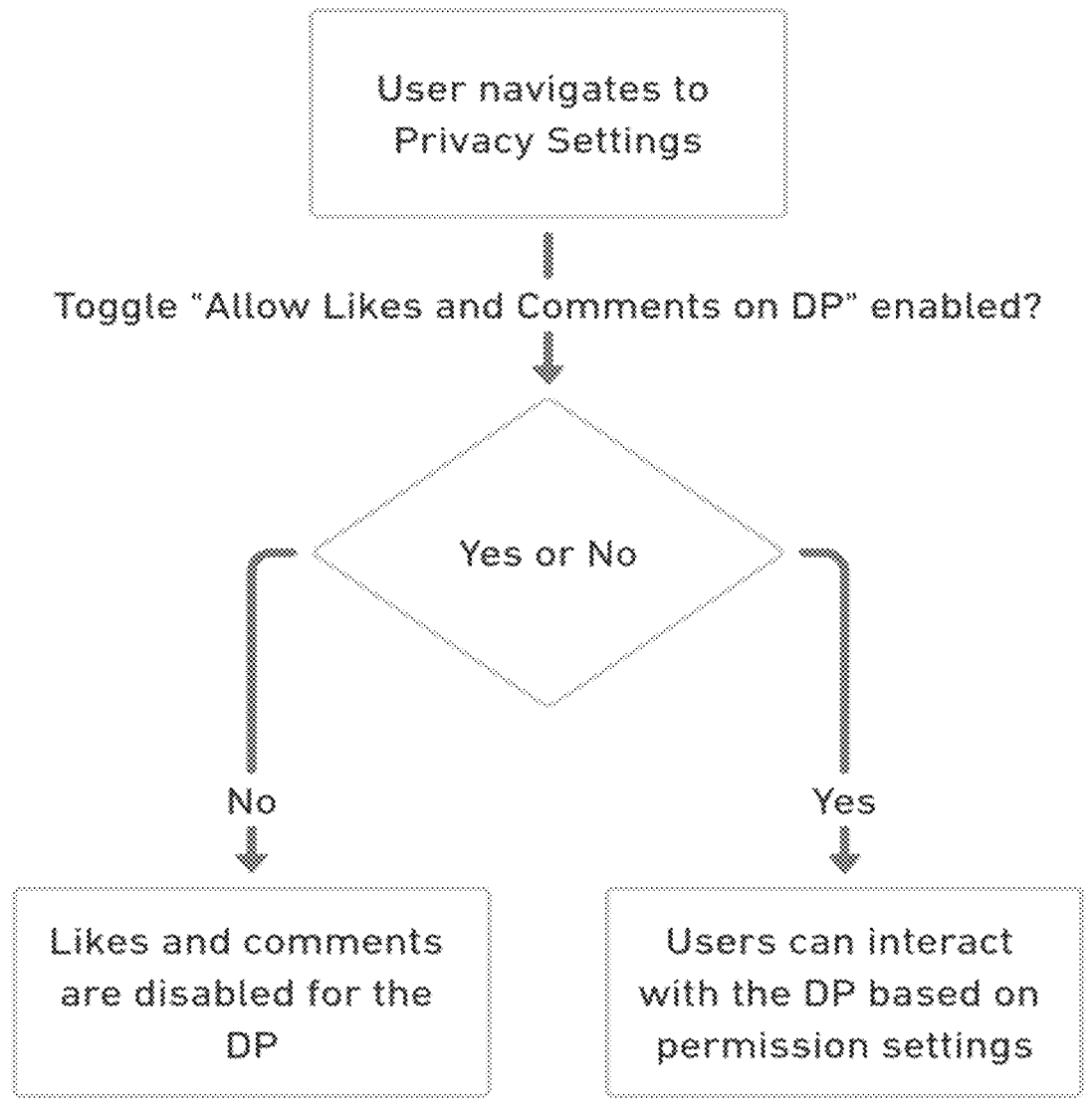
FIG. 3A: Depicts the Like and Comment on DP feature, illustrating how users interact with display pictures through engagement options.

As shown in FIG. 3A, the Like and Comment on DP feature in the Chat Dip app enhances user engagement by allowing individuals to interact with profile pictures (DPs) through likes and comments while maintaining privacy and control. This feature is designed with a user-centric approach, enabling profile owners to decide who can engage with their DP. Users must explicitly enable the feature via their account settings or profile preferences, ensuring that participation is voluntary. By default, the feature is enabled, but users have the flexibility to restrict interactions to specific groups or individuals, such as "Everyone," "Friends," or a custom list. Upon activation, a permission prompt informs users that only they can view the names of those who like or comment on their DP, reinforcing privacy.

Figure 3B:
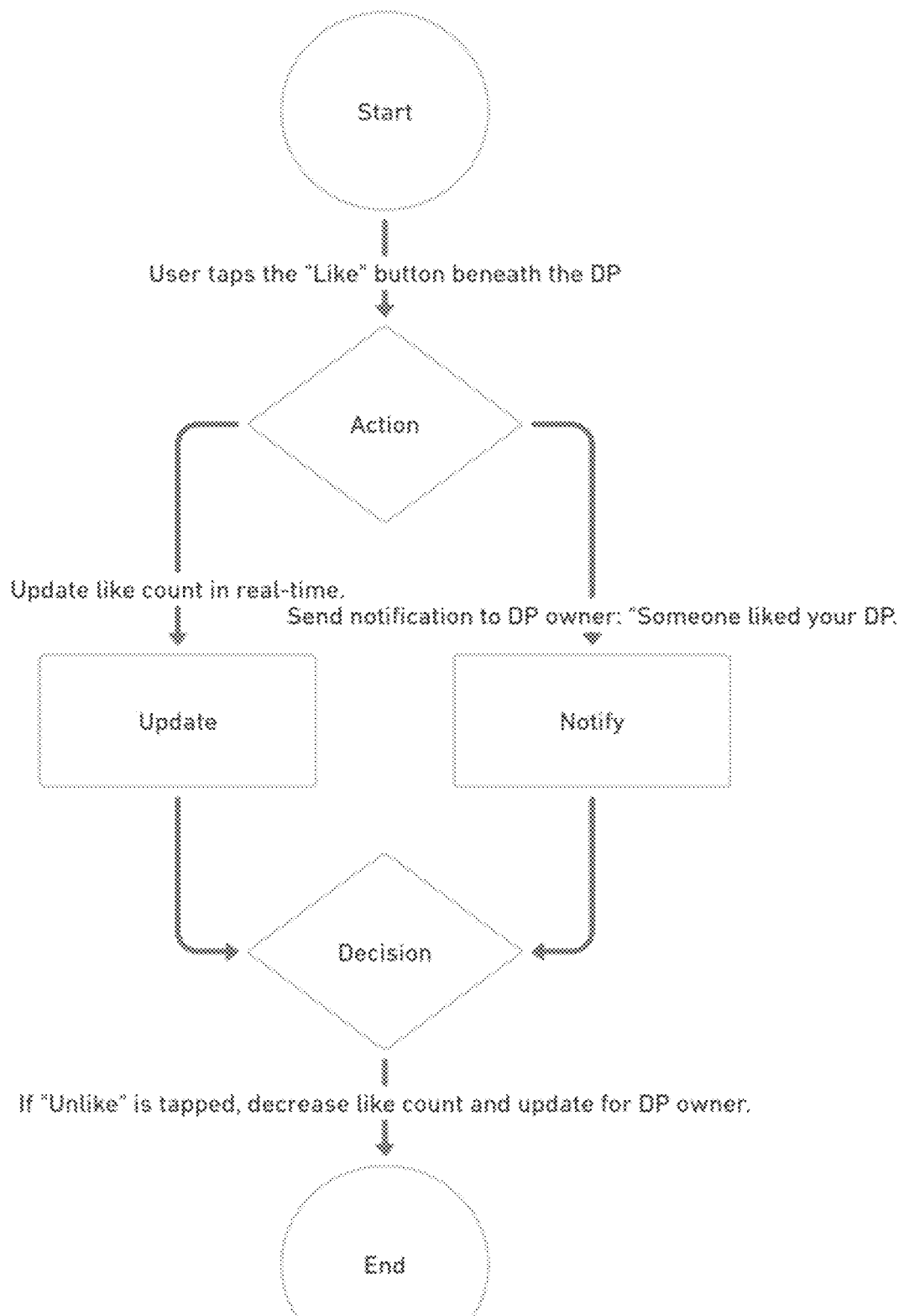
FIG. 3B: Demonstrates the like functionality, allowing users to express appreciation for a display picture with a simple interaction.

As shown in FIG. 3B, the like functionality provides a simple yet effective way for users to express appreciation for a DP. A heart icon beneath the profile picture allows users to like the image, and the profile owner receives a notification whenever someone interacts with their DP. However, to maintain privacy, only the like count is displayed to other users, without revealing the identities of those who liked the image. Unlike traditional social media platforms, Chat Dip ensures that only the DP owner can access the list of users who liked their picture. This approach prevents unnecessary visibility and protects user anonymity. If a user changes their mind, they can remove their like at any time, and the like count dynamically updates in real time for both the profile owner and viewers.

Figure 3C:
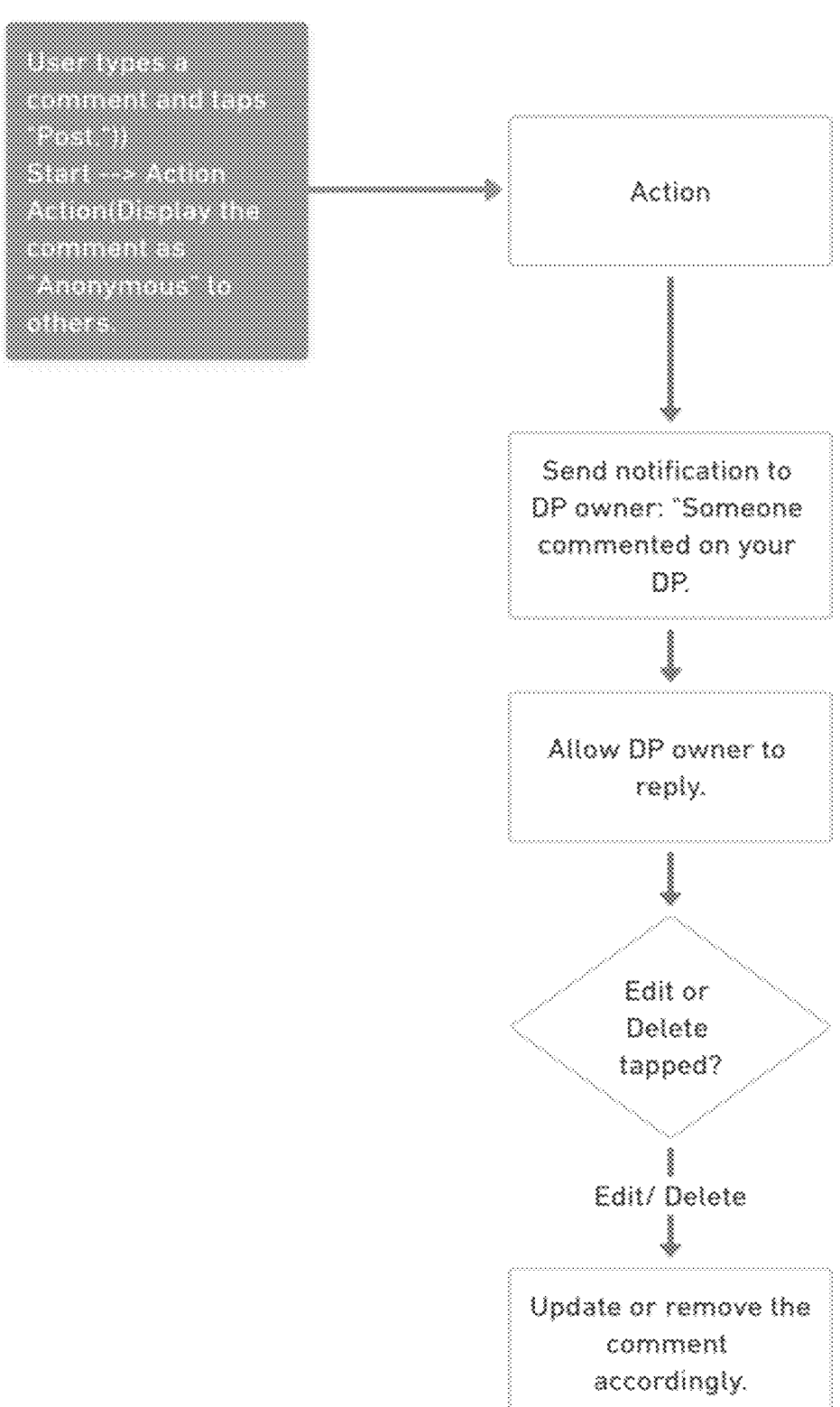
FIG. 3C: Shows the comment functionality, enabling users to leave remarks on a DP while ensuring anonymity and privacy controls.

As shown in FIG. 3C, the comment functionality allows users to leave remarks on a DP while ensuring strict anonymity controls. A comment box beneath the DP provides a space for users to add their messages, and the profile owner receives a notification for each new comment. To uphold privacy, the identity of the commenter remains hidden from other users, appearing as "Anonymous." Only the DP owner can see the actual usernames of those who commented, ensuring that public interactions remain discreet. This feature prevents potential misuse while still enabling meaningful engagement, Commenters retain the ability to edit or delete their remarks at any time, giving them full control over their contributions. To limit unnecessary conversation threads, only the DP owner has the privilege to reply to comments, ensuring focused interaction and preventing unwanted discussions.

Figure 3D:
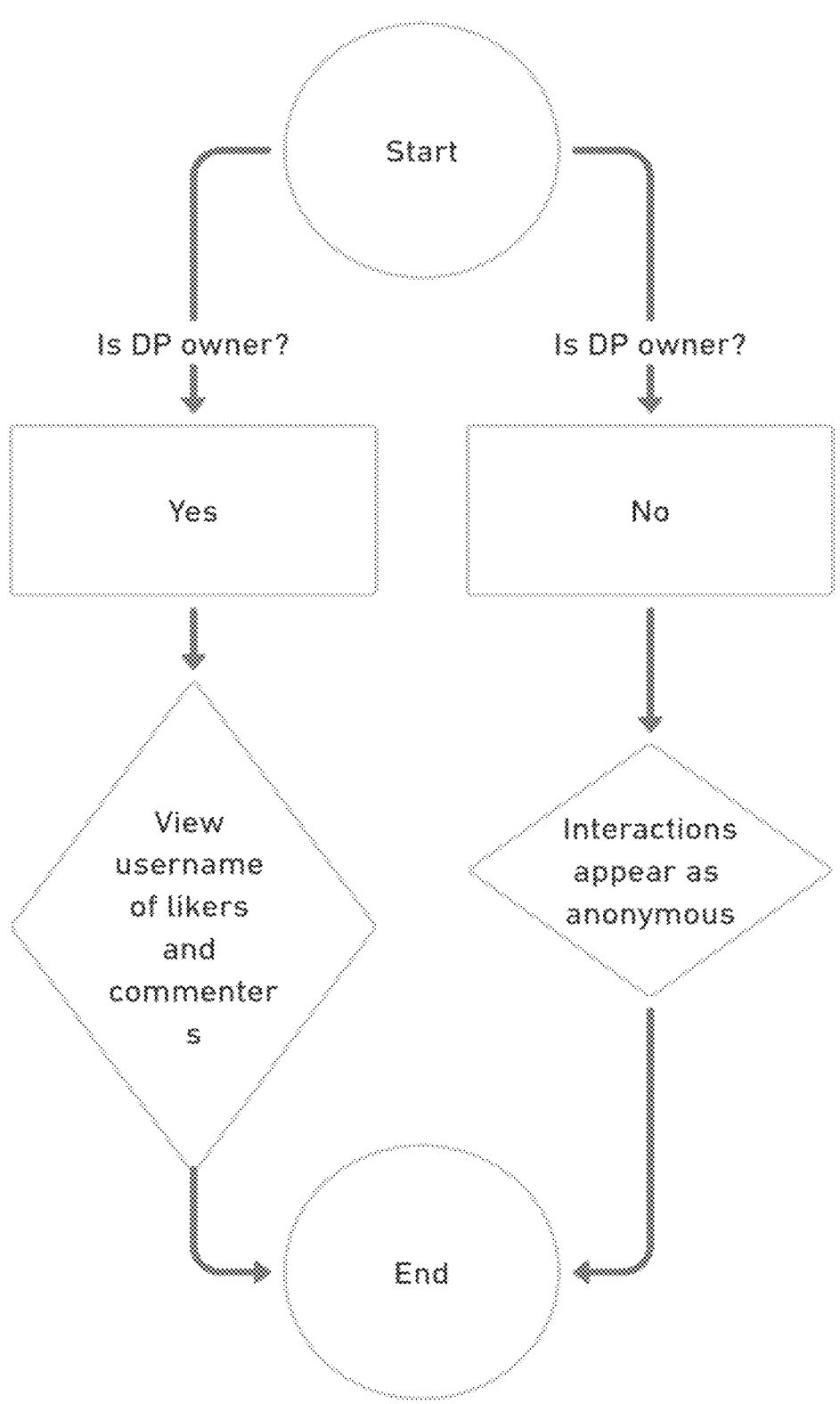
FIG. 3D: Illustrates the security and privacy mechanisms incorporated into the Like and Comment on DP feature, ensuring that interactions remain confidential and under user control.

As shown in FIG. 3D, Privacy and security are central to the Like and Comment on DP feature, ensuring that user interactions remain confidential. Anonymity rules prevent anyone besides the DP owner from viewing the names of likers or commenters. Additionally, users cannot click on an anonymized name to access the liker's or commenter's profile, further restricting potential privacy breaches. To maintain exclusivity, DP owners are unable to screenshot or share the list of likers and commenters, ensuring that the interaction remains within the app, Users also have the option to block specific individuals from liking or commenting on their DP, granting complete control over who can engage with their profile picture.

The feature is designed to deliver real-time updates, ensuring that like and comment counts refresh instantly for all users viewing the DP. If a user interacts with a DP, the changes reflect immediately without requiring a page reload. This dynamic updating mechanism ensures an uninterrupted experience while preventing delays in engagement. Additionally, the app is optimized to handle a high volume of likes and comments efficiently, ensuring smooth performance even for users with a large number of interactions on their profile pictures. The system effectively manages data load to prevent lag and enhance responsiveness, ensuring that engagement remains seamless regardless of user activity levels.

The user interface of the Like and Comment feature is designed for an intuitive experience, allowing users to interact effortlessly with DPs. The like button, represented by a heart icon, is placed directly beneath the profile picture for easy access. The comment section is structured as a thread beneath the DP, displaying all comments in a clear and organized manner. To maintain privacy, only a numeric count of likes (e.g., "5 likes") is visible to other users, without disclosing identities. Similarly, the total number of comments appears beneath the DP, allowing users to gauge engagement levels while keeping participant details private. This well-structured UI ensures a user-friendly, secure, and efficient interaction experience for all Chat Dip users.

6. Dip Nearby Feature

The Dip Nearby feature provides users with an innovative way to connect with people in their vicinity, enabling them to discover potential friends or acquaintances at events, gatherings, or common locations. By activating the feature, users can browse profiles of nearby individuals, send connection requests, and engage in conversations. This function is designed to enhance social interaction while ensuring that users have full control over their visibility, privacy, and connection preferences. Users must agree to the platform's Terms and Conditions upon activating the feature and proceed to create their Dip Nearby profile before they can start interacting with others.

To facilitate seamless access, the Dip Nearby feature is conveniently placed within the app, accessible through a bottom sheet icon. Users can enable or disable it through the settings menu under the name "Dip Nearby." This strategic placement ensures ease of use while allowing individuals to engage with the feature only when desired. The feature's intuitive toggle option grants users flexibility in controlling their participation in the location-based friend finder system.

Profile creation is a key aspect of the Dip Nearby experience, requiring users to enter essential details such as a unique username, age, gender, and a brief description in the "About" section. The system verifies the availability of usernames to ensure uniqueness. Users must also upload a primary profile picture, with the option to include up to three additional images. The minimum age requirement for participating in Dip Nearby is set at 18 years, ensuring a safe and mature user base.

To further personalize their experience, users can provide additional details, including preferences for connection types (e.g., Everyone, Female, or Male), hometown, height, spoken languages, religion, and educational background. Users may also list their work experience, job title, and company name to make their profiles more informative. These details contribute to enhanced matching, allowing individuals to find connections that align with their interests and preferences.

Once the required details are entered, users are prompted to review their profiles before proceeding. This review process ensures that all information is accurate and complete, allowing users to make adjustments if necessary. By finalizing the profile setup, users ensure they are ready to explore and interact with others in the Dip Nearby community.

For the Dip Nearby feature to function effectively, users must grant location access. Upon enabling the feature, the app requests permission to determine their real-time location using GPS services. This ensures that users are matched with individuals within their chosen search radius. The default search radius is set at 5 km, with the flexibility to adjust it up to a maximum of 35 km, giving users control over how far they wish to connect.

Once the profile setup and location access are complete, users can start exploring nearby profiles. The browsing mechanism allows users to swipe left or right to navigate through different profiles. The platform displays relevant profile details such as username, distance, and a blank profile picture if the person is not yet a friend. This design ensures that privacy is maintained while offering users a glimpse of potential connections.

Users receive invites in the form of friend requests from nearby individuals. In the Invites section, they can view detailed information about the sender before deciding to accept or reject the request. Accepting a request initiates a conversation, while rejecting it dismisses the invite. This structured workflow ensures that users have control over who they interact with, promoting a secure and comfortable experience.

Once a friend request is accepted, the system automatically creates a chat between both users, allowing them to communicate directly within the app. This chat system provides a dedicated space for Dip Nearby interactions, separate from other conversations. The feature ensures that all communication remains within the app, preventing the exchange of personal contact details like phone numbers.

Users have the flexibility to enable or disable the Dip Nearby feature at any time through their settings. When enabled, their profile becomes visible in searches, and they can discover other users within their selected radius. When disabled, users become invisible to others but can still access previously added friends. This functionality provides users with the ability to participate in the feature on their own terms.

To maintain the integrity of the Dip Nearby platform, users must complete a two-step verification process, which includes identity and document verification. Identity verification requires users to scan their face using the app's built-in camera, while document verification involves submitting a government-issued ID such as a passport or driver's license. This security measure ensures that all participants are genuine, fostering a safer online community.

Users who fail to verify their profiles within seven days will no longer be visible to others on Dip Nearby, Non-verified users are restricted to sending a maximum of 10 requests per day, whereas verified users can send up to 50 requests daily. This system encourages users to complete the verification process while maintaining fair engagement levels within the platform.

The GPS-based location services utilized in Dip Nearby determine the proximity between users and facilitate accurate matchmaking. Users must grant location permissions upon first using the feature, ensuring their presence is reflected correctly within the selected search radius. The app provides users with control over their location preferences, allowing them to modify their radius settings at any time.

The profile discovery process ensures that users can view limited details of nearby individuals, including their username and distance. Personal information such as phone numbers and profile pictures remain hidden unless users mutually connect. This anonymity ensures privacy while still allowing users to gauge potential interactions based on basic details.

Once a user selects a profile they are interested in, they can send a friend request by tapping the "Send Message Request" button. The recipient receives a notification with the option to approve or ignore the request. If approved, a chat is initiated with either a generic system-generated message or a custom message from the sender. This structured request system ensures that all interactions are consensual.

Dip Nearby conversations are managed through a dedicated chat section, separate from existing contact lists. Users have the option to block or report individuals at any time, ensuring a safe communication environment, Additionally, chat messages can be deleted individually or in bulk, providing users with control over their chat history.

Security settings in Dip Nearby reinforce user privacy by restricting profile visibility, location access, and communication channels. Profile pictures remain hidden unless both users mutually approve a request, and phone numbers are never shared. These measures ensure that all interactions occur securely within the app's ecosystem.

The Dip Nearby preferences section allows users to tailor their search and visibility settings for a personalized experience. Users can choose whether they wish to appear in searches, specify their preferred gender for connections, and set location preferences. These options ensure that users interact with individuals who align with their interests and comfort levels.

To refine potential matches, users can apply filters based on age range, height, language proficiency, and education level. These filters enhance the accuracy of search results, ensuring that users connect with individuals who meet their specific criteria. The ability to customize these parameters improves the overall user experience by making matches more relevant.

Dip Nearby settings provide users with the ability to manage notifications, privacy controls, and account deletion options. Notification preferences allow users to toggle alerts for reminders, invites, and messages, while privacy settings enable them to block or unblock users as needed. If users wish to leave the platform, they have the option to permanently delete their Dip Nearby profile.

For those who wish to take a temporary break from Dip Nearby, the feature allows users to deactivate their profile for 15, 30, or 45 days. During this period, the profile remains invisible to others, and the user will not receive messages or notifications. Once the break ends, the profile is reactivated automatically, restoring all previous connections and interactions.

The Help and Support section offers users access to resources such as tips and guidelines for effective use, a help center for frequently asked questions, and troubleshooting assistance. These support features enhance the overall user experience, ensuring that users can navigate the platform seamlessly.

Push notifications play a crucial role in keeping users informed about new connection requests. If the recipient's app is not open, they receive a push notification displaying the sender's name along with a generic message. If the receiver opens the notification, they are redirected to the nearby chat section where they can respond to the request.

The Dip Nearby feature is designed to give users full control over their social interactions while ensuring safety and privacy. With visibility controls, location-based matching, verification measures, and secure in-app messaging, it offers a well-rounded approach to meeting and connecting with new people. Whether for casual chats, networking, or social expansion, Dip Nearby enhances user engagement while prioritizing security and comfort.

7. Camera Feature

The present disclosure relates to an enhanced camera system integrated within a messaging application, providing users with seamless and intuitive multimedia capturing capabilities. The camera functionalities are designed to optimize user experience through dynamic image and video capture, efficient zoom control, and seamless media sharing, all within a user-friendly interface.

The camera interface is designed for ease of use, initializing in the default image capture mode to allow users to instantly take photos for messaging purposes. The interface provides an intuitive experience where users can tap the camera icon to capture images without additional configuration. The captured image is instantly previewed, enabling quick confirmation before sending it to a chat. This feature ensures a frictionless multimedia sharing experience, allowing users to communicate visually with minimal effort.

The application further enables short video sharing by allowing users to toggle between image and video modes. With a single tap on the video icon, the interface transitions into video recording mode, initiating recording automatically. The user can capture a video of up to one minute, with a visible countdown timer to indicate the remaining recording duration. Upon recording completion, a preview is displayed for user confirmation before sending. This feature provides a streamlined workflow for sharing short, real-time video clips within conversations.

To enhance media capture capabilities, the system incorporates a user-friendly zoom functionality that allows users to dynamically adjust the camera zoom level using natural gestures. By sliding their thumb or finger upwards, users can zoom in to capture distant objects more clearly, while sliding downward zooms out. The zoom level dynamically updates in real time, with the maximum zoom factor reaching up to 5×, depending on the device's camera capabilities. Additionally, an on-screen slider provides an alternative method for adjusting zoom. This functionality ensures that users can capture precise and detailed images or videos regardless of distance.

Beyond real-time media capture, the system also integrates seamless access to the device's gallery, enabling users to select and share previously captured images or videos, By tapping the gallery icon within the camera interface, users can browse their media library, preview selected files, and send them directly into a chat. This feature ensures that users can conveniently share high-quality images or recorded videos without the need to exit the messaging application, thereby enhancing the overall user experience.

A key aspect of the camera interface is its ability to allow users to toggle effortlessly between image and video modes. The camera interface initializes in the default photo capture mode, ensuring a quick start for capturing still images. However, users can instantly switch to video recording mode with a single tap on the video icon, allowing immediate recording with an integrated countdown timer. Similarly, users can switch back to image capture mode by tapping the image icon, ensuring a fluid and flexible multimedia capturing experience. This feature enables users to adapt their media-sharing preferences dynamically within the chat environment.

The enhanced camera system within the messaging application is built to provide a superior multimedia sharing experience through seamless image and video capture, intuitive zoom control, integrated gallery access, and effortless mode toggling. These functionalities ensure that users can communicate more effectively using rich media while maintaining a highly intuitive and efficient interaction process within the app.

Use Case 1: Instant Media Sharing, the messaging application allows users to instantly capture and send images within a chat conversation. When a user taps the camera icon, the interface opens in default image capture mode, ensuring quick access without additional configurations. The user can point the camera at the desired scene, take a picture with a single tap, and preview the image before confirming its delivery. This feature ensures that users can rapidly share images without switching between multiple screens, thereby improving the speed and convenience of multimedia messaging.

Use Case 2: Short Video Share, the application enables users to record and share short video clips of up to one minute, By tapping the video icon, the camera seamlessly switches to video mode, initiating recording automatically. A countdown timer displays the remaining recording duration, ensuring users can manage their capture time efficiently. Once recorded, the video preview appears for review before sending. This feature provides a quick and efficient way to share video content without requiring additional video editing or trimming, making real-time video messaging more accessible.

Use Case 3: Efficient Zoom Control, the application integrates an intuitive zoom feature that allows users to adjust the zoom level dynamically using simple gestures. Users can zoom in by sliding their thumb or finger upward and zoom out by sliding downward. Additionally, a zoom slider is available for precise adjustments. The app dynamically displays the current zoom level, allowing users to fine-tune their image or video capture. This ensures that users can capture distant objects clearly, enhancing the versatility of the camera interface.

Use Case 4: Device Gallery Access allows users to browse and share previously captured images or videos directly from the messaging application. By tapping the gallery icon, the user gains access to their device's photo and video library. They can scroll through their media files, select the desired image or video, preview it, and confirm before sending. This seamless integration eliminates the need to exit the chat interface, making it convenient to share existing media while maintaining the flow of conversation, Use Case 5: Toggle Between Image and Video Modes, users can easily switch between photo and video capture modes within the camera interface. The default mode initializes in image capture, allowing instant photography. However, users can switch to video mode with a single tap on the video icon, enabling immediate recording with a visible countdown timer. If needed, the user can tap the image icon to revert to photo mode instantly. This flexible toggling mechanism ensures that users can dynamically choose their preferred media format without unnecessary interruptions, enhancing overall usability.

The enhanced camera functionalities within the messaging application ensure a seamless multimedia experience by integrating instant image and video capture, smooth zoom control, easy access to the device gallery, and effortless toggling between media modes. These intuitive features allow users to capture and share high-quality visual content while maintaining an efficient and user-friendly interaction within the app.

Expiring Messages for Enhanced Privacy

Privacy is a crucial aspect of modern communication, and the present invention introduces an expiring message feature that ensures confidentiality. Unlike standard messages that remain in chat history indefinitely, expiring messages are automatically deleted after a predefined interval or upon being read. Users can customize expiration settings based on their needs, choosing to delete messages after a single view, a set duration, or a predefined number of interactions.

For example, in scenarios involving confidential business discussions, sensitive financial transactions, or personal conversations, users can enable self-destructing messages to prevent unauthorized access. This feature enhances security beyond conventional encryption by ensuring that messages do not persist beyond their intended timeframe.

AI-Driven Real-Time Translation

With the increasing globalization of communication, language barriers often hinder seamless interactions between speakers of different languages. The present invention addresses this challenge by integrating an AI-powered translation engine that provides real-time translation of messages. When users engage in conversations with individuals speaking different languages, the system automatically detects the language and translates messages instantly, enabling fluid and natural communication.

Unlike conventional translation tools that require manual copying and pasting of text, the present invention performs translations within the chat interface, allowing messages to be sent and received in the user's preferred language without any additional steps. This functionality is particularly beneficial for international business communications, social networking across different linguistic regions, and real-time customer support interactions.

Message-to-Task Conversion and Calendar Integration

Recognizing the increasing need for productivity within messaging platforms, the present invention incorporates a feature that allows users to convert messages into actionable tasks, to-do lists, or meeting reminders. This integration transforms conversations from passive exchanges into dynamic workflows, ensuring that important information is not lost in lengthy chat threads.

For instance, if a user receives a message instructing them to complete a specific task or attend a meeting, they can instantly convert that message into a task with a due date and priority level. The system integrates with external calendar applications, such as Google Calendar or Microsoft Outlook, allowing users to synchronize tasks seamlessly. By bridging the gap between messaging and task management, this feature enhances organization and efficiency, reducing the likelihood of missed deadlines or overlooked instructions.

Offline Messaging with AI-Powered Synchronization

Traditional messaging applications require a stable internet connection to send and receive messages. However, users often find themselves in situations where network connectivity is unreliable, such as during travel or in remote locations. The present invention overcomes this limitation by allowing users to compose and respond to messages offline.

Unlike conventional offline messaging, which relies on manual synchronization, this system employs AI-driven algorithms to determine the optimal time for syncing messages once connectivity is restored. The AI analyzes network availability, user activity patterns, and message priority levels to ensure that messages are delivered efficiently without requiring user intervention. This ensures that users remain connected and engaged, even in challenging network conditions, Automatic Transcription and Editing of Voice Notes Voice messaging has become an increasingly popular form of communication due to its convenience and speed. However, voice notes often pose challenges in terms of accessibility, searchability, and editing. The present invention introduces an advanced speech-to-text transcription system that automatically converts voice messages into text, making them searchable and editable.

This functionality enhances communication in various ways. For instance, users who prefer reading over listening can quickly scan transcribed messages without playing the audio. Additionally, transcribed text can be edited before sending, allowing users to correct errors or refine their messages. This feature is particularly useful for professional settings where accurate and structured communication is essential.

AI-Powered Message Summarization

In group chats or lengthy conversations, users often struggle to keep track of important information. The present invention addresses this issue by incorporating an AI-driven message summarization feature. The system analyzes chat history, identifies key points, and generates concise summaries that provide an overview of the conversation.

This feature is particularly useful in professional and collaborative environments where team discussions involve multiple participants and extensive message exchanges. Instead of scrolling through long chat threads, users can quickly review a summary and extract essential information. The AI adapts to user preferences, ensuring that summaries highlight relevant details based on context and conversation flow.

Secure Chat Hiding and Authentication Mechanism

To enhance privacy, the present invention introduces a secure chat hiding feature that allows users to conceal specific conversations. Unlike traditional chat-hiding mechanisms that rely on simple archive functions, this system employs a room number and passcode authentication method.

When a user hides a chat, it becomes invisible within the messaging interface. To access the hidden conversation, the user must enter the correct room number and passcode, ensuring that only authorized individuals can retrieve the chat. Additionally, the system includes a passcode recovery mechanism that allows users to regain access through their registered email in case of forgotten credentials. This enhanced security measure ensures that sensitive conversations remain protected from unauthorized access.

Location-Based Nearby Feature for Localized Communication

The present invention incorporates a "Nearby" feature that enables users to discover and communicate with others in their immediate geographical vicinity. This functionality is particularly beneficial for social networking, local business engagements, event-based interactions, and community building.

Users can adjust the search radius, specifying whether they want to connect with people within a 100-meter range, 1 km, or beyond. This feature facilitates real-world connections, allowing users to interact with nearby individuals based on shared interests, location-based recommendations, or professional networking opportunities.

AI-Driven Message Suggestions and Predictive Responses

To improve communication efficiency, the present invention integrates an AI-powered message suggestion engine that analyzes conversation flow and context to provide relevant response suggestions. This feature reduces response time by presenting users with intelligent reply options that align with the tone and nature of the conversation.

For example, in professional discussions, the AI may suggest formal replies, whereas in casual conversations, it may provide more relaxed and informal responses. The system continuously learns from user interactions, refining its suggestions over time to align with individual preferences. This enhances productivity and ensures consistency in communication, Status Feature for Enhanced User Engagement The invention also includes a status feature that allows users to share updates, moods, or activity indicators with their contacts. Unlike traditional availability indicators that simply display "online" or "offline" status, this feature enables users to post text, images, or short videos, fostering interactive engagement. This functionality enriches the user experience by providing a platform for self-expression and social connectivity within the messaging application.

The present invention represents a groundbreaking advancement in messaging systems by integrating AI-driven communication enhancements, security features, automation, and productivity tools into a single, cohesive platform.

By addressing the limitations of existing messaging applications, this invention offers users a seamless, intelligent, and highly secure communication experience. The combination of dynamic message scheduling, real-time translation, offline messaging, secure chat hiding, and AI-powered features ensures that the system meets the evolving demands of modern digital communication.

What is claimed is:

1. A messaging and social interaction system, comprising:
a local user computer with Internet access capabilities;
a computer application generating access to a server;
wherein the server operates:
a dynamic message scheduling and unscheduling module configured to allow users to schedule messages for future delivery based on predefined conditions, including recipient availability, location detection, or behavioral patterns, and further enabling unscheduling of messages before dispatch;
a private chat feature incorporating a hide/unhide mechanism wherein the users can conceal selected conversations behind a virtual room secured with a unique room number and passcode, with an option for passcode recovery via a pre-registered email;
a self-destructing messaging module enabling messages to auto-delete after predefined conditions are met, including time-based expiration, single-view destruction, or custom deletion intervals set by a sender;
a private calling feature facilitating encrypted calls with temporary call identifiers, call log obfuscation, and self-erasing call records to ensure privacy;
a profile interaction system allowing the users to engage with profile pictures by liking and commenting, with visibility controls set by a profile owner;
location-based friend discovery module, a Dip Nearby module, configured to detect and display the users within a predefined radius, enabling controlled interaction through request-based connections and verification-based authentication;
a user verification framework incorporating facial recognition and document authentication to validate user identities, restrictring interaction privileges for non-verified users;
an AI-powered messaging assistant configured to provide real-time message translation, contextual conversation summarization, intelligent message suggestions, and offline message composition with predictive synchronization;
a voice-to-text transcription feature that allows the users to convert voice messages into text, search within transcribed messages, edit specific parts, and highlight critical sections for quick reference;
an incognito mode enabling the users to temporarily hide their online presence and message delivery status from all contacts;
a camera module integrated within the messaging system, comprising:
an instant image and video capture feature, allowing the users to take photos or record videos directly within a chat interface and share the photos and videos instantly;
a toggle function enabling seamless switching between image and video modes with a single tap;

an efficient zoom control mechanism, supporting gesture-based zoom adjustment through sliding gestures and an on-screen zoom slider for precision control;

a flash control feature, enabling the users to toggle flash settings for enhanced photography in low-light conditions; and a device gallery access module, allowing the users to select and share previously captured media from their device storage directly within the chat interface; and at least one memory wherein the at least one memory stores information generated by the private calling feature operated by the server.

2. The system of claim 1, wherein the dynamic message scheduling module determines recipient availability based on prior interaction history and real-time status indicators.

3. The system of claim 1, wherein the dynamic message scheduling module enables the sender to specify conditional triggers.

4. The system of claim 1, wherein the private chat feature includes an additional layer of security by allowing the user to configure automatic deletion of chat content after a specified period of inactivity.

5. The system of claim 1, wherein a hidden chat feature allows selective unhide functionality based on biometric authentication.

6. The system of claim 1, wherein the self-destructing messaging module provides an option for ephemeral media sharing, allowing images and videos to disappear after being viewed once.

7. The system of claim 1, wherein the private calling feature is configured to generate randomized call logs with generic contact names, preventing identification of actual call participants.

8. The system of claim 1, wherein the profile interaction system includes an option for the users to restrict visibility of likes and comments on their profile pictures to selected contacts.

9. The system of claim 1, wherein the Dip Nearby module enables the users to define a custom visibility range between 5 km and 35 km, dynamically adjusting based on activity levels.

10. The system of claim 1, wherein the user verification framework enforces a mandatory verification process within seven days of registration, after which unverified users are restricted from sending more than 10 connection requests per day.

11. The system of claim 1, wherein the AI-powered messaging assistant detects long conversation threads and generates a concise summary of key discussion points for the user.

12. The system of claim 1, wherein the AI-powered messaging assistant enables the offline message composition and auto-synchronization upon detecting a stable network connection.

13. The system of claim 1, wherein the voice-to-text transcription feature allows the users to search, edit, and highlight specific parts of transcribed voice messages.

14. The system of claim 1, wherein the AI-powered messaging assistant integrates with third-party calendar applications, automatically converting date-related messages into reminders or scheduled events.

15. The system of claim 1, wherein a messaging platform provides an option for the users to delete entire chat histories in a single action while maintaining backup encryption for recovery within a specified timeframe.

16. The system of claim 1, wherein the camera module allows real-time media enhancements, including AI-powered filters, brightness adjustments, and background blurring for video calls.

17. The system of claim 1, wherein the camera module includes a privacy-focused setting that disables screenshot capturing for sensitive images and videos shared within chats.

18. The system of claim 1, wherein the camera module allows gesture-based controls for capturing images, including hand-wave detection or voice command activation.

19. The system of claim 1, wherein the camera module incorporates real-time face beautification and AI stickers, enhancing user experience for multimedia messaging.

20. The system of claim 1, wherein the users can enable the incognito mode that temporarily hides their online presence, typing status, and message delivery indicators from all contacts.

\* \* \* \* \*